US012300096B2

(12) United States Patent
Choi et al.

(10) Patent No.: US 12,300,096 B2
(45) Date of Patent: May 13, 2025

(54) ELECTRONIC DEVICE FOR CONTROLLING EXTERNAL ELECTRONIC DEVICE AND METHOD THEREOF

(71) Applicant: Samsung Electronics Co., Ltd., Gyeonggi-do (KR)

(72) Inventors: Inhyuk Choi, Gyeonggi-do (KR); Bokun Choi, Gyeonggi-do (KR); Doosuk Kang, Gyeonggi-do (KR); Seula Kim, Gyeonggi-do (KR); Seungnyun Kim, Gyeonggi-do (KR); Hyeonggeun Kim, Gyeonggi-do (KR); Ilsung Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 17/857,312

(22) Filed: Jul. 5, 2022

(65) Prior Publication Data

US 2022/0335818 A1 Oct. 20, 2022

Related U.S. Application Data

(63) Continuation of application No. PCT/KR2021/000285, filed on Jan. 8, 2021.

(30) Foreign Application Priority Data

Jan. 14, 2020 (KR) .................. 10-2020-0004965
Jan. 7, 2021 (KR) .................. 10-2021-0002019

(51) Int. Cl.
G08C 17/02 (2006.01)
G06F 3/0484 (2022.01)
(Continued)

(52) U.S. Cl.
CPC ............ *G08C 17/02* (2013.01); *G06F 3/0484* (2013.01); *H04W 4/80* (2018.02); *H04W 76/14* (2018.02);
(Continued)

(58) Field of Classification Search
CPC ... G08C 17/02; G08C 2201/93; G06F 3/0484; G06F 3/165; H04W 4/80; H04W 76/14
See application file for complete search history.

(56) References Cited

U.S. PATENT DOCUMENTS 7,996,571 B2   8/2011 Salokannel
8,032,472 B2  10/2011 Tsui et al.
(Continued)

FOREIGN PATENT DOCUMENTS

KR   10-2019-0084584 A   7/2019

OTHER PUBLICATIONS

Korean Office Action dated Mar. 10, 2025.

*Primary Examiner* — Tuan H Nguyen
(74) *Attorney, Agent, or Firm* — Cha & Reiter, LLC

(57) ABSTRACT

A wearable electronic device and method are disclosed. The wearable electronic device includes a short-range communication circuit, memory, display and a processor. The processor implements the method, including: establishing a first communicative connection to a first external electronic device, via a short-range communication circuit, receiving, via the short-range communication circuit, from the first external electronic device, first information related to a second external electronic device that is communicatively connected to the first external electronic device through a second communicative connection, displaying, on a display, at least a portion of the received first information, and transmitting, via the short-range communication circuit, to the first external electronic device, a control command for
(Continued)

the second external electronic device, based on receiving a user input to information displayed on the display.

19 Claims, 16 Drawing Sheets

(51) Int. Cl.
  *H04W 4/80*   (2018.01)
  *H04W 76/14*  (2018.01)
  *G06F 3/16*   (2006.01)
(52) U.S. Cl.
  CPC .......... *G06F 3/165* (2013.01); *G08C 2201/93* (2013.01)

(56) References Cited

U.S. PATENT DOCUMENTS

| | | |
|---|---|---|
| 8,209,275 B2 | 6/2012 | Tsui et al. |
| 9,086,687 B2 | 7/2015 | Park et al. |
| 9,131,332 B2 | 9/2015 | Newham et al. |
| 9,661,117 B2 | 5/2017 | Wilder et al. |
| 9,819,779 B2 | 11/2017 | Lee et al. |
| 9,946,229 B2 | 4/2018 | Park et al. |
| 10,129,380 B2 | 11/2018 | Wilder et al. |
| 10,342,428 B2 | 7/2019 | Boesen et al. |
| 10,838,690 B2 | 11/2020 | Nahman et al. |
| 2007/0140187 A1* | 6/2007 | Rokusek ................. H04L 67/51 370/338 |
| 2007/0281762 A1 | 12/2007 | Barros et al. |
| 2008/0248750 A1 | 10/2008 | Tsui et al. |
| 2017/0111723 A1 | 4/2017 | Boesen |
| 2017/0223162 A1* | 8/2017 | Wilder .............. H04M 1/72412 |
| 2018/0063313 A1 | 3/2018 | Lee et al. |
| 2018/0253213 A1 | 9/2018 | Wang |
| 2019/0227766 A1 | 7/2019 | Nahman et al. |
| 2021/0068194 A1 | 3/2021 | Han et al. |

\* cited by examiner

ELECTRONIC DEVICE FOR CONTROLLING EXTERNAL ELECTRONIC DEVICE AND METHOD THEREOF

CROSS-REFERENCE TO RELATED APPLICATION(S)

This application is a continuation of and claims priority under 35 U.S.C. § 120 to PCT International Application No. PCT/KR2021/000285, which was filed on Jan. 8, 2021, and claims priority to Korean Patent Application No. 10-2020-0004965, filed on Jan. 14, 2020, and Korean Patent Application No. 10-2021-0002019, filed on Jan. 7, 2021 in the Korean Intellectual Property Office, the disclosures of which are incorporated by reference herein their entirety.

BACKGROUND

Technical Field

The disclosure relates to interworking between electronic devices, and more particular, to remote control of external devices using a wearable electronic device.

Description of Related Art

Various types of wearable electronic devices (e.g., companion devices) have been introduced to consumers. Many such devices may be communicatively connected to a mobile phone. For example, a wearable electronic device may be connected to a mobile phone, or a plurality of wearable electronic devices may be connected to the mobile phone. Such wearable electronic devices may perform a variety of functions and operations. For example, the wearable electronic devices may include a speaker or an earphone to perform an audio output operation for the mobile phone. Alternatively, the wearable electronic device may be a smart watch, which is more portable than a mobile phone and may provide a variety of information to the user by interworking with the mobile phone.

The mobile phone may be communicatively connected to at least one wearable electronic device over a wireless network.

The wearable electronic devices are often highly compact devices, which may provide a variety of functions. Accordingly, the wearable electronic device often omits component typical to larger devices, such as a display, as it aims instead for portability and simplicity of user interaction. Therefore, higher complexity operations are typically reserved for interoperation with a mobile phone. For example, if a user inputs a desired control command into the mobile phone, the mobile phone may transmit the control command to the wearable device via wireless network connection. Alternatively, there have been suggestions to control the mobile via inputs made to the wearable electronic device.

A mobile phone may be connected to at least two wearable electronic devices over a wireless network. A user may operate the mobile phone, to identify respective states of the wearable devices, and control the functions of the wearable devices. However, when the mobile phone is stowed away (e.g., in a bag), or when the user is moving with the stowed mobile phone (e.g., in the bag), convenient access to the mobile phone may be restricted or hampered. In such cases, the user may wish to determine or control the state of another device using one of their wearable devices, rather than the stowed mobile phone.

To control another wearable electronic device using the wearable electronic device, an additional connection between the wearable electronic devices may be considered. However, the establishment of an additional connection over the wireless network may not be preferable, because the wearable electronic device is restricted in various aspects. For example, when the additional connection over the wireless network is established, the smaller capacity battery of the wearable device may be drained rapidly by the extra power consumption. Accordingly, the available operational time of the wearable electronic device may be significantly reduced. In another example, the wearable electronic device may be hampered in performance, as the electronic device establishes new connections to other external electronic device over the wireless network. In this case, the wearable electronic devices may release the connection to the existing mobile phone, and establish interconnections between the wearable electronic devices over the wireless network. However, when the wearable electronic device repeatedly releases and/or establishes connections over the wireless network, additional power may be consumed. In addition, the user may be required to perform additional manipulations to establish the connections between the wearable electronic devices over the wireless network, reducing user convenience.

As the wearable electronic device is restricted in various operational aspects, a wearable electronic devices that has no direct connection may fail to perform an operation identifying the state of a counterpart wearable electronic device from among a number of wearable electronic devices, and/or fail to properly control the counterpart wearable electronic device.

SUMMARY

According to an embodiment of the disclosure, a wearable electronic device includes a short-range communication circuit; a memory; a display; and a processor operatively coupled to the short-range communication circuit, the memory and the display, wherein the processor is configured to: establish a first communicative connection with a first external electronic device via the short-range communication circuit; receive, via the short-range communication circuit, from the first external electronic device, first information related to a second external electronic device that is communicatively connected to the first external electronic device through a second connection; control the display to display at least a portion of the received first information; and transmit, via the short-range communication circuit, to the first external electronic device, a control command for the second external electronic device, based on receiving a user input to information displayed on the display.

According to an embodiment of the disclosure, a method for operating a wearable electronic device may include establishing a first communicative connection to a first external electronic device, via a short-range communication circuit; receiving, via the short-range communication circuit, from the first external electronic device, first information related to a second external electronic device that is communicatively connected to the first external electronic device through a second communicative connection; displaying, on a display, at least a portion of the received first information; and transmitting, via the short-range communication circuit, to the first external electronic device, a control command for the second external electronic device, based on receiving a user input to information displayed on the display.

In addition, according to another embodiment of the disclosure, a non-transitory computer readable medium storing programming instructions is disclosed, in which the programming instructions are executable by a processor to cause an electronic device to establish a first communicative connection with a first external electronic device via a short-range communication circuit; receive, via the short-range communication circuit, from the first external electronic device, first information related to a second external electronic device that is communicatively connected to the first external electronic device through a second connection; control a display to display at least a portion of the received first information; and transmit, via the short-range communication circuit, to the first external electronic device, a control command for the second external electronic device, based on receiving a user input to information displayed on the display.

According to embodiments of the disclosure, the user may utilize a wearable electronic device communicatively connected to the mobile phone, to control another wearable electronic device communicatively connected to the mobile phone. Accordingly, user convenience may be maintained or increased, as the user is able to control another device using the wearable device, even when the mobile phone is inaccessible (e.g., stowed in a bag).

Furthermore, a variety of other beneficial effects may be directly or indirectly understood through the disclosure.

With regard to description of drawings, the same or similar components will be marked by the same or similar reference signs.

DETAILED DESCRIPTION

Hereinafter, certain embodiments of the disclosure may be described with reference to accompanying drawings. Accordingly, those of ordinary skill in the art will recognize that modification, equivalent, and/or alternative on the certain embodiments described herein can be variously made without departing from the disclosure.

Figure 1:
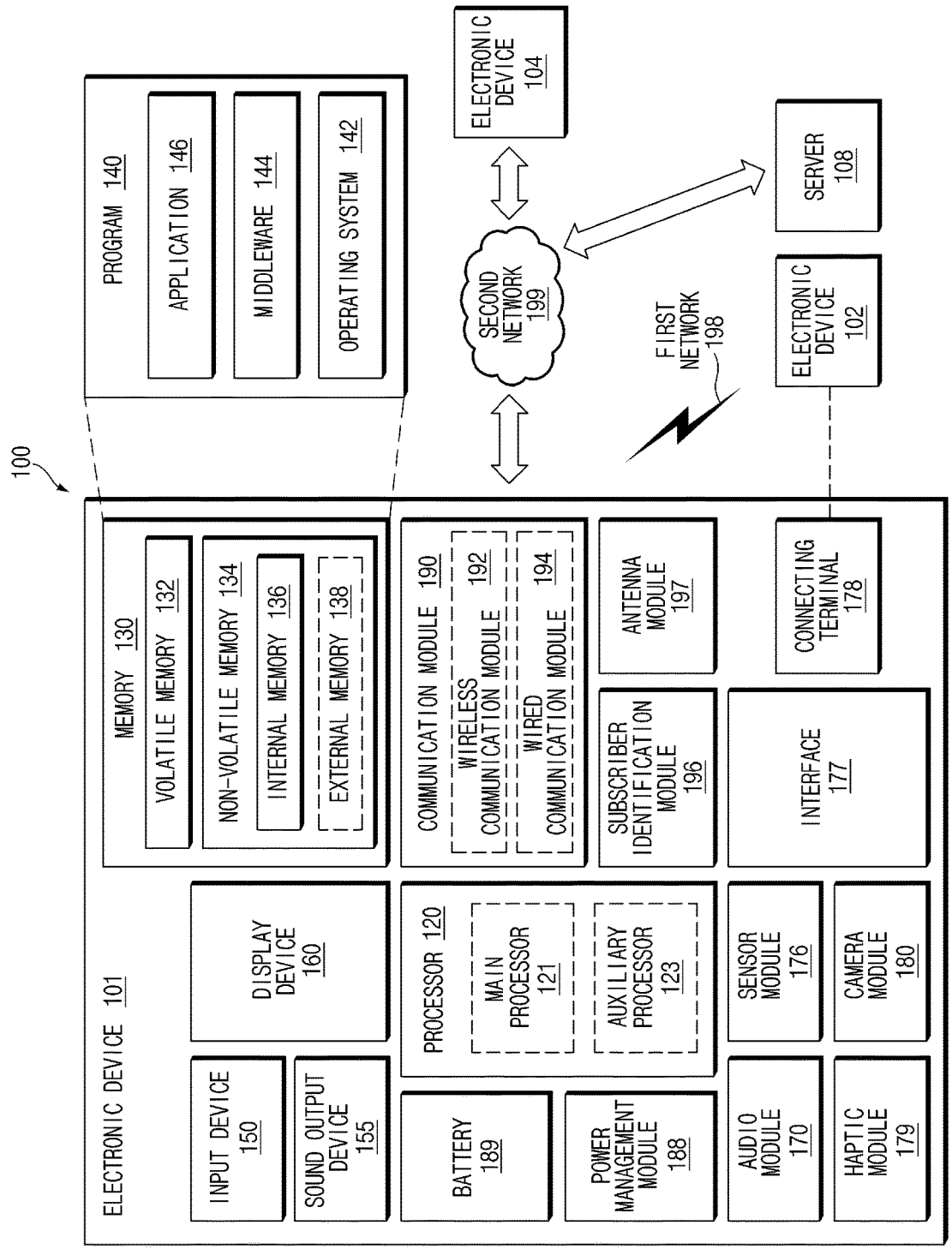
FIG. 1 is a block diagram of an electronic device in a network environment, according to certain embodiments.

FIG. 1 is a block diagram of an electronic device 101 in a network environment 100 according to certain embodiments. Referring to FIG. 1, the electronic device 101 may communicate with an electronic device 102 through a first network 198 (e.g., a short-range wireless communication network) or may communicate with an electronic device 104 or a server 108 through a second network 199 (e.g., a long-distance wireless communication network) in a network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. According to some embodiments, at least one (e.g., the display device 160 or the camera module 180) among components of the electronic device 101 may be omitted or one or more other components may be added to the electronic device 101. According to some embodiments, some of the above components may be implemented with one integrated circuit. For example, the sensor module 176 (e.g., a fingerprint sensor, an iris sensor, or an illuminance sensor) may be embedded in the display device 160 (e.g., a display).

The processor 120 may execute, for example, software (e.g., a program 140) to control at least one of other components (e.g., a hardware or software component) of the electronic device 101 connected to the processor 120 and may process or compute a variety of data. According to an embodiment, as a part of data processing or operation, the processor 120 may load a command set or data, which is received from other components (e.g., the sensor module 176 or the communication module 190), into a volatile memory 132, may process the command or data loaded into the volatile memory 132, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121 or with the main processor 121. Additionally or alternatively, the auxiliary processor 123 may useless power than the main processor 121, or is specified to a designated function. The auxiliary processor 123 may be implemented separately from the main processor 121 or as a part thereof.

The auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123.

The memory 130 may store a variety of data used by at least one component (e.g., the processor 120 or the sensor module 176) of the electronic device 101. For example, data may include software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may receive a command or data, which is used for a component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 160 may visually provide information to the outside (e.g., the user) of the electronic device 101. For example, the display device 160 may include a display, a hologram device, or a projector and a control circuit for controlling a corresponding device. According to an embodiment, the display device 160 may include a touch circuitry configured to sense the touch or a sensor circuit (e.g., a pressure sensor) for measuring an intensity of pressure on the touch.

The audio module 170 may convert a sound and an electrical signal in dual directions. According to an embodiment, the audio module 170 may obtain the sound through the input device 150 or may output the sound through the sound output device 155 or an external electronic device (e.g., the electronic device 102 (e.g., a speaker or a headphone)) directly or wirelessly connected to the electronic device 101.

The sensor module 176 may generate an electrical signal or a data value corresponding to an operating state (e.g., power or temperature) inside or an environmental state (e.g., a user state) outside the electronic device 101. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols to allow the electronic device 101 to connect directly or wirelessly to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. According to an embodiment, the haptic module 179 may include, for example, a motor, a piezoelectric element, or an electric stimulator.

The camera module 180 may shoot a still image or a video image. According to an embodiment, the camera module 180 may include, for example, at least one or more lenses, image sensors, image signal processors, or flashes.

The power management module 188 may manage power supplied to the electronic device 101. According to an embodiment, the power management module 188 may be implemented as at least a part of a power management integrated circuit (PMIC).

The battery 189 may supply power to at least one component of the electronic device 101. According to an embodiment, the battery 189 may include, for example, a non-rechargeable (primary) battery, a rechargeable (secondary) battery, or a fuel cell.

The communication module 190 may establish a direct (e.g., wired) or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the direct (e.g., wired) communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module). The corresponding communication module among the above communication modules may communicate with the external electronic device 104 through the first network 198 (e.g., the short-range communication network such as a Bluetooth, a WiFi direct, or an IrDA (infrared data association)) or the second network 199 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 192 may identify and authenticate the electronic device 101 using user information (e.g., international mobile subscriber identity (IMSI)) stored in the subscriber identification module 196 in the communication network, such as the first network 198 or the second network 199.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 104 through the server 108 connected to the second network 199. Each of the external electronic devices 102 and 104 may be the same or different types as or from the electronic device 101. According to an embodiment, all or some of the operations performed by the electronic device 101 may be performed by one or more external electronic devices among the external electronic devices 102, 104, or 108. For example, when the electronic device 101 performs some functions or services automatically or by request from a user or another device, the electronic device 101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 101. The electronic device 101 may provide the result as is or after additional processing as at least a part of the response to the request. To this end, for example, a cloud computing, distributed computing, or client-server computing technology may be used.

The electronic device according to certain embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that certain embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Certain embodiments of the disclosure may be implemented by software (e.g., the program 140) including an instruction stored in a machine-readable storage medium (e.g., an internal memory 136 or an external memory 138) readable by a machine (e.g., the electronic device 101). For example, the processor (e.g., the processor 120) of a machine (e.g., the electronic device 101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to certain embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to certain embodiments, each component (e.g., the module or the program) of the above-described components may include one or plural entities. According to certain embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to certain embodiments, operations performed by a module, a programming, or other components may be executed sequentially, in parallel, repeatedly, or in a heuristic method, or at least some operations may be executed in different sequences, omitted, or other operations may be added.

Figure 2:
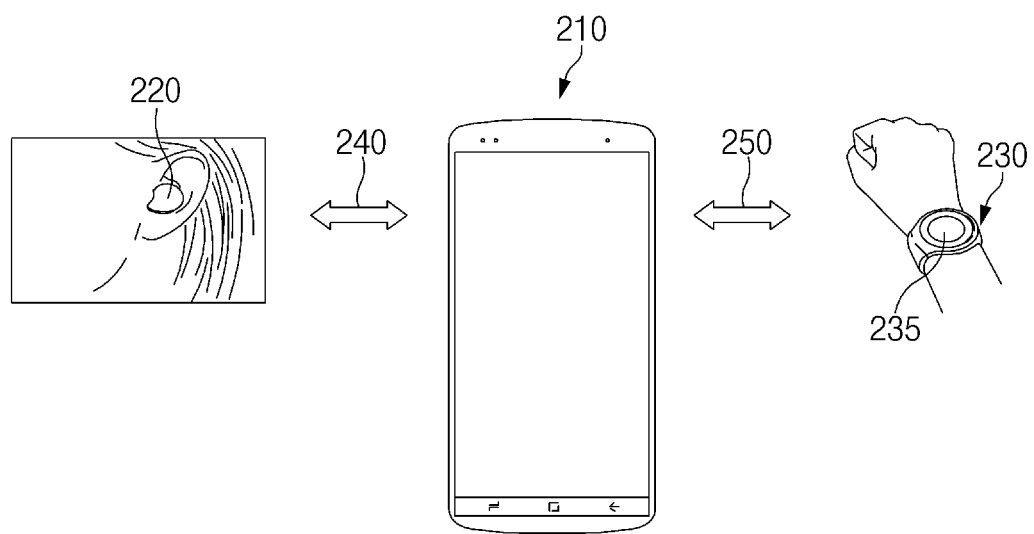
FIG. 2 is a view illustrating the connection state of a wearable electronic device, according to an embodiment.

FIG. 2 is a view illustrating an example connection state of a wearable electronic device, according to an embodiment.

Referring to FIG. 2, a plurality of wearable electronic devices (e.g., a second external electronic device 220, a wearable electronic device 230, and the electronic device 101 of FIG. 1) may form an inter-device connection (e.g., a first inter-device connection 250 or a second inter-device connection 240) with a mobile phone (e.g., the first external electronic device 210 or the electronic device 102 of FIG. 1) through a short-range wireless communication network (e.g., the first network 198 of FIG. 1)

According to an embodiment, the wearable electronic device 230 may include an electronic device such as a smart glass, a wireless earphone, or a wearable cam, which is able to be put on a body of the user. The second external electronic device 220 may include any one of an electronic device (e.g., a smart watch, a smart glass, a wireless earphone, a wearable cam), which is affixable to a body of the user, or an electronic device (e.g., a mobile phone, a tablet, a laptop, and a wireless keyboard) which is able to be carried by the user. A first external electronic device 210 may include any one of electronic devices, such as a mobile phone, a tablet, or a laptop, which is able to be carried by the user. The device type and number of devices involved with the wearable electronic device 230, the first external electronic device 210, or the second external electronic device 220 of FIG. 2 are provided for illustrative purposes, and it should be understood that the disclosure is not limited thereto.

According to an embodiment, the inter-device connections 240 and 250 formed using the short-range communication circuit (e.g., the wireless communication module 192 of FIG. 1) may be referred to as a short-range communication network (e.g., the first network 198 of FIG. 1). For example, the short-range communication network may be referred to as a network established through Bluetooth (e.g., Bluetooth low energy), WiFi direct, near field communication (NFC), ultra-wideband (UWB) communication, or an infrared data association (IRDA). The second inter-device connection 240 and the first inter-device connection 250 may be communication connections based on the same short-range communication network or based on different short-range communication networks. For example, both the first inter-device connection 250 and the second inter-device connection 240 may be a BT-based connections. In addition, the first inter-device connection 250 may be a BT-based connection, and the second inter-device connection 240 may be a Wi-Fi-based connection. The type of the short-range communication network (e.g., the first network 198 of FIG. 1) of FIG. 2 is provided for illustrative purposes, and an embodiment of the disclosure is not limited thereto.

According to an embodiment, the first external electronic device 210 of FIG. 2 may be a mobile phone (e.g., a smartphone), the second external electronic device 220 may be a wireless earphone, and the wearable electronic device 230 may be a smart watch. Referring to FIG. 2, the mobile phone 210 may form the second inter-device connection 240 and the first inter-device connection 250 together with the wireless earphone 220 and the smart watch 230, respectively. The wireless earphone 220 and the smart watch 230 may not form any connection based on a short-range communication network.

Figure 3:
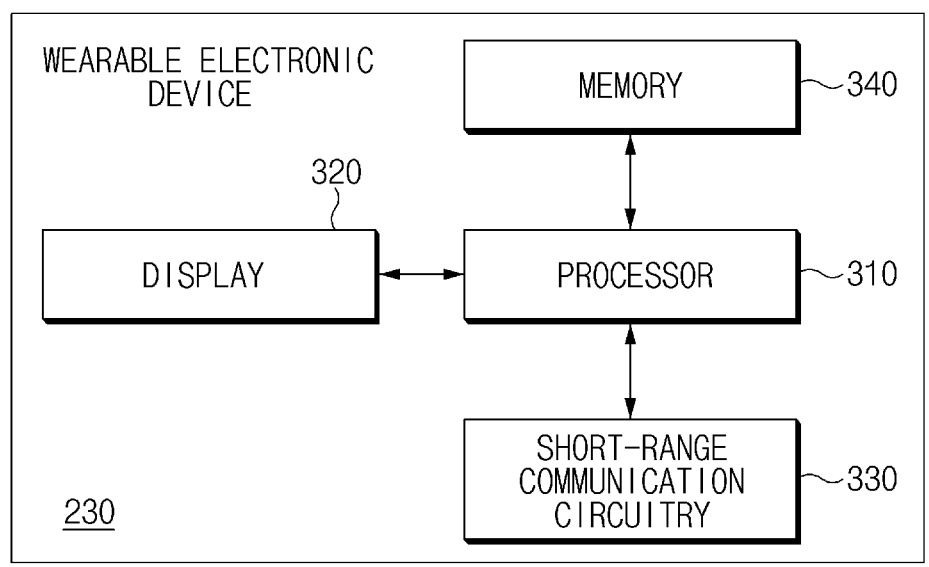
FIG. 3 is a block diagram illustrating the structure of a wearable electronic device, according to an embodiment.

FIG. 3 is a block diagram illustrating the structure of an example wearable electronic device, according to an embodiment.

According to an embodiment, the wearable electronic device 230 may include a processor 310, a display 320, a short-range communication circuit 330, and/or a memory 340. Embodiments of this disclosure are not limited thereto. For example, the wearable electronic device 230 may further include a component not illustrated in FIG. 3, or may omit at least some of the components illustrated in FIG. 3. For example, the wearable electronic device 230 may further include the battery 189 of FIG. 1, the antenna module 197, and/or the sensor module 176.

According to an embodiment, the processor 310 (e.g., the main processor 121 of FIG. 1) may execute, for example, software (e.g., the program 140 of FIG. 1) to control at least one different component (e.g., a hardware and/or software component) of the wearable electronic device 230 operatively connected to the processor 310 and to process or compute various data.

According to an embodiment, the display 320 (e.g., the display device 160 of FIG. 1) may visually display information to a user of the wearable electronic device 230. The display 320 may include a touch circuit configured to detect a touch-based input, or a sensor circuit (e.g., a pressure sensor) configured to measure the strength of force generated by the touch.

According to an embodiment, the short-range communication circuit 330 (e.g., the communication module 190 of FIG. 1) may establish a wireless communication channel between the wearable electronic device 230 and the external electronic device (e.g., the first external electronic device 210 and/or the second external electronic device 220), and may support continued inter-device communication through the established communication channel. The short-range communication circuit 330 may be referred to as a wireless communication module (e.g., reference numeral 192 of FIG. 1; e.g., a short-range wireless communication module).

According to an embodiment, the memory 340 (e.g., the memory 130 of FIG. 1) may store various data used by at least one component (e.g., the processor 310) of the wearable electronic device 230. The program (e.g., the program 140 of FIG. 1) may be stored as software in the memory 340 and may include, for example, an operating system (e.g., the operating system 142 of FIG. 1), middleware (e.g., reference numeral 144 of FIG. 1), or an application (e.g., reference numeral 146 of FIG. 1). The data may include, for example, input data or output data for the program and a command associated with the program.

According to an embodiment, the wearable electronic device 230 may include the short-range communication circuit 330, the memory 340, the display 320, and/or the processor 310. The processor 310 may form a first inter-device connection (e.g., the first inter-device connection 250 of FIG. 1) together with the first external electronic device (e.g., the first external electronic device 210 of FIG. 2) through the short-range communication circuit 330, may receive first information associated with the second external electronic device connected to the first external electronic device through a second inter-device connection (e.g., the second inter-device connection 240 of FIG. 1), from the first external electronic device, may display at least a portion of the first information on the first display 320, and may transmit a control command, which is used to control the second external electronic device, to the first external electronic device through the short-range communication circuit 330, in response to a user input for the information displayed on the display 320. For example, the first information may include device-related information or function-related information of the second external electronic device. The device-related information may include an MAC address, a model number, a model name, or manufacturer information, and the function-related information may include a battery level, an operating state, or information on a function to be performed.

According to an embodiment, the processor 310 may be further configured to display a graphic object on the display 320, when the inter-device connection is made between the first external electronic device and the second external electronic device. For example, when a user input is received with respect to the graphic object, the processor 310 may be further configured to display a control interface (UI) on the display 320, and the control UI may be generated based on the first information.

According to an embodiment, the processor 310 may be further configured to receive second information associated with at least one third external electronic device from the first external electronic device, may display at least a portion of the first information or the second information on the display 320, and may transmit, to the first external electronic device through the short-range communication circuit 330, a control command for forming the inter-device connection between the second external electronic device and the at least one third external electronic device, in response to a user input for information displayed on the display 320. For example, the first information includes device-related information having a connection history to the second external electronic device, and the second information includes device-related information registered in an account associated with the first external electronic device. When a connection history is present between the at least one third external electronic device and the second external electronic device, and when the at least one third external electronic device is registered for the information on an account linked to the first external electronic device, the processor 310 may be further configured to display at least a portion of the first information or the second information on the display 320. For example, the second external electronic device may be an audio output device or an audio input device.

According to an embodiment, the wearable electronic device 230 may further include a sensor (e.g., the sensor module 176 of FIG. 1), the first information may include information on the change in mode of the second external electronic device, and the processor 310 may be further configured to sense the state of a user using the sensor, and display, on the display 320, at least a portion of the information on the change in mode of the second external electronic device, based on the state of the user.

According to an embodiment, the wearable electronic device 230 may further include a sensor, and the processor 310 may be further configured to sense the state of the user by using the sensor, and transmit a control command for changing the mode of the second external electronic device based on the state of the user, to the first external electronic device by using the short-range communication circuit 330.

Figure 4:
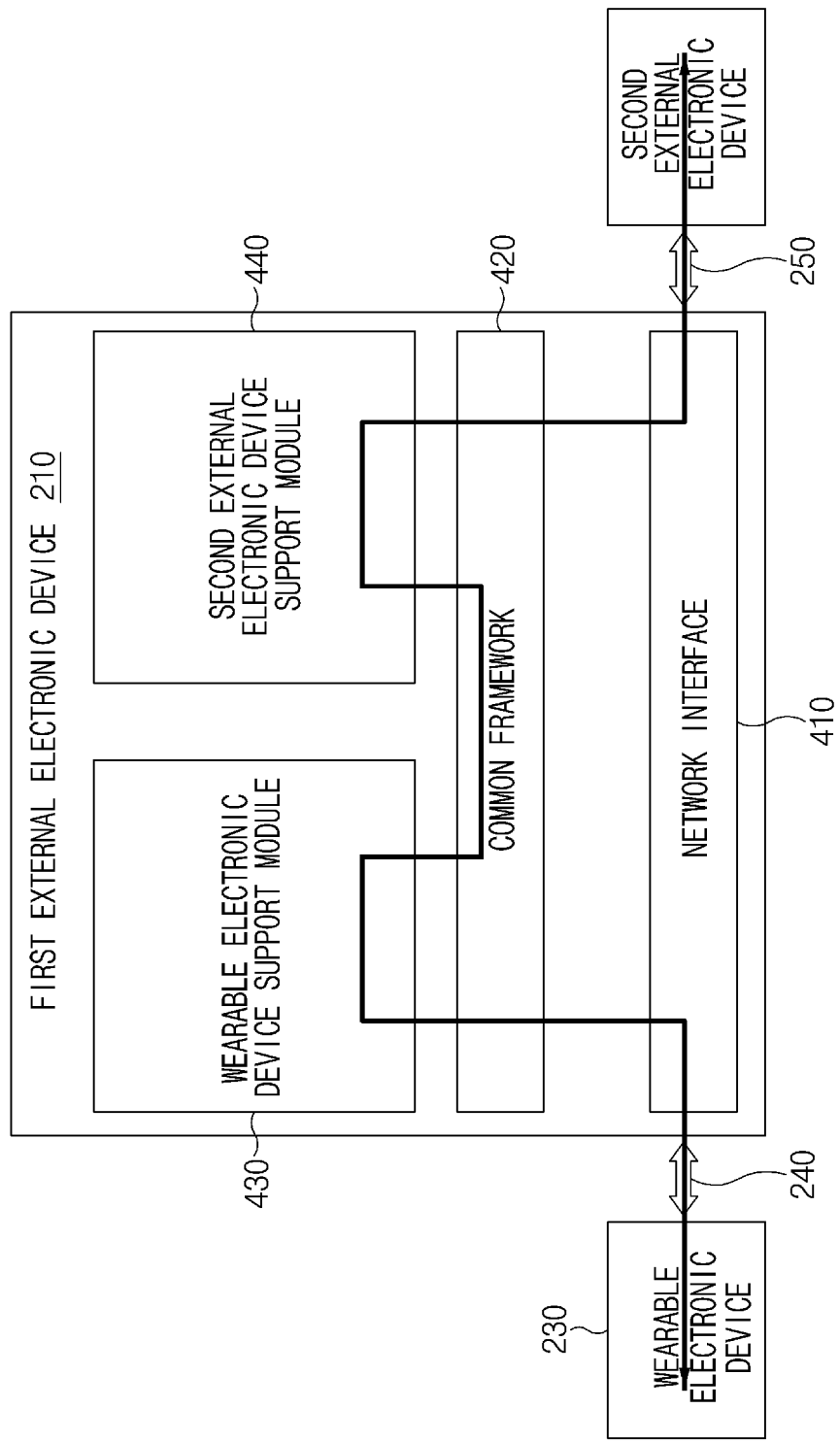
FIG. 4 illustrates software components of a first external electronic device to process a control command for a second external electronic device, according to an embodiment.

FIG. 4 illustrates software components of a first external electronic device to process a control command for a second external electronic device, according to an embodiment.

According to an embodiment, the software components of the first external electronic device 210 may include a network interface 410, a common framework 420, a wearable electronic device support module 430 and/or a second external electronic device support module 440. The software components of the first external electronic device 210 may include sets of instructions stored in a memory (e.g., the memory 130 of FIG. 1) of the first external electronic device 210. The software components of the first external electronic device 210 are provided for illustrative purposes, and embodiments of the disclosure are not limited thereto.

According to an embodiment, although not illustrated, the network interface 410 may support an operation related to a communication module (e.g., the communication module 190 of FIG. 1) included in the first external electronic device 210. For example, the network interface 410 may support establishing a wireless communication channel between the first external electronic device 210 and peripheral electronic devices (e.g., the wearable electronic device 230 and the second external electronic device 220) and/or facilitating communication through the established communication channel. The first external electronic device 210 may establish the first inter-device connection 250 with the wearable electronic device 230 by using the network interface 410. The first external electronic device 210 may establish the second inter-device connection 240 with the second external electronic device 220 by using the network interface 410. According to an embodiment, the network interface 410 may include at least one network driver. For example, the network interface 410 may include a network driver supporting BT and a network driver supporting WIFI.

The wearable electronic device support module 430 may process an input/output of a command related to the wearable electronic device 230 connected through the first inter-device connection 250. According to an embodiment, the second external electronic device support module 440 may process an input/output of a command related to the second external electronic device 220 connected through the second inter-device connection 240. The common framework 420 may transmit a command from each peripheral device to another peripheral device, transmit each command in the form of a bypass, or process each command to the form of a command to be recognized by each peripheral device and transmit the command to the peripheral device.

According to an embodiment, the first external electronic device 210 may establish the first inter-device connection 250 and the second inter-device connection 240 with the wearable electronic device 230 and the second external electronic device 220, respectively, through a short-range communication network technology (e.g., Bluetooth, WiFi, BLE, or UWB) by using the network interface 410 The wearable electronic device 230 may transmit a control command for controlling the second external electronic device 220, to the first external electronic device 210 through the first inter-device connection 250.

The first external electronic device 210 may process the control command, which is received using the network interface 410, using the common framework 420. The common framework 420 may relay an operation of processing a control command in the wearable electronic device support module 430 and the second external electronic device support module 440. A message format supported through each wireless communication (e.g., the first inter-device connection 250 and the second inter-device connection 240) may differ from a message format to be processed by a support module of each electronic device. The common framework 420 may transform a message format of the control command, which is received from the wearable electronic device 230, into a message format processible by the wearable electronic device support module 430. The wearable electronic device support module 430 may process a control command having the transformed message format. Similarly, the common framework 420 may transform a message format of the control command, which is processed by the wearable electronic device support module 430, into a message format to be processed by the second external electronic device support module 440. The second external electronic device support module 440 may process a control command having the transformed message format. The common framework 420 may transform the control command, which is processed by the second external electronic device support module 440, into a message format supported by the second inter-device connection 240, so that the control command is transmitted to the second external electronic device 220 through the second inter-device connection 240. The control command, which is processed through the relaying of the common framework 420, may be transmitted to the second external electronic device 220 through the second inter-device connection 240.

Figure 5:
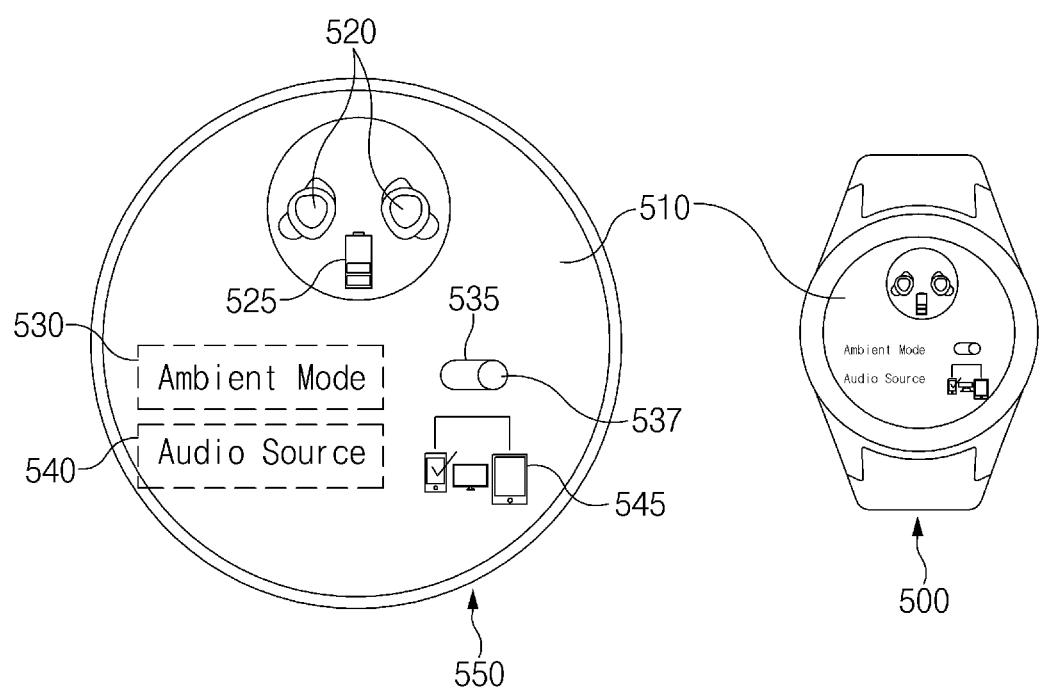
FIG. 5 illustrates that a wearable electronic device displays, on a display, at least a portion of information received from a first external electronic device.

FIG. 5 illustrates that a wearable electronic device displays, on a display, at least a portion of information received from a first external electronic device.

According to an embodiment, a smart watch 500 (e.g., the wearable electronic device 230 of FIG. 2) may display information on a wireless earphone (e.g., the second external electronic device 220 of FIG. 2) on a display 510 (e.g., the display 320 of FIG. 3) to inform the user of the information. Reference numeral 550 of FIG. 5 illustrates an enlarged perspective view of a screen displayed on the display 510 of the smart watch 500. The user may recognize information on the type, the state information, and/or a controllable function of an external electronic device (e.g., a wireless earphone), based on the information displayed on the display 510.

Referring to the screen 550 displayed on the display 510, the smart watch 500 may display an icon 520 for a wireless earphone, battery gauge information 525, text information 530 on a mode, text information 540 on an audio source, and/or a user interface (UI), such as a control lever 535, or an icon 545 for selecting an audio source, through the display 510. The information on the electronic device and the type of the UI displayed through the display 510 are for illustrative purposes, and an embodiment of the disclosure is not limited thereto. The user may identify the state of the wireless earphone through the information and the icon displayed on the display 510 of the smart watch 500 or control the function of the wireless earphone by manipulating (e.g., touching or scrolling) the UI displayed on the display 510. For example, the user may change the operating mode of the wireless earphone, or perform a control operation of switching the audio source by manipulating the UI.

According to an embodiment, the smart watch 500 may display, on the display 510, at least a portion of the first information related to the second external electronic device (e.g., the second external electronic device 220 of FIG. 2) received from a mobile phone (e.g., the first external electronic device 210 of FIG. 2) connected through an inter-device connection (e.g., the first inter-device connection 250 of FIG. 2). The first information may include information on the type of the second external electronic device 220 connected to the mobile phone 210, battery gauge information 525 of a wireless earphone, mode information 530 and 535, and/or audio source information 540 and 545.

Referring to FIG. 5, when the second external electronic device 220 is a wireless earphone, the type of the second external electronic device 220 may be displayed as the icon 520 for the wireless earphone. The battery gauge information 525 of the wireless earphone may include information on a remaining battery capacity of the wireless earphone. The smart watch 500 may periodically receive the first information, which includes the battery gauge information 525, from the mobile phone 210 and may periodically update the display of the battery gauge information 525, based on the first information.

The mode information 530 and 535 may include information on a present operating state of the wireless earphone. According to an embodiment, when the wireless earphone supports an ambient mode function, the first information may include information on an ambient mode supported by the wireless earphone. After receiving the first information from the mobile phone 210, the smart watch 500 may display the mode information 530 and 535 of the wireless earphone through the display 510. For example, while the wireless earphone is operating in the ambient mode, the user may hear not only music output through the wireless earphone, but may also hear output of ambient noise around the user. The ambient mode may also be referred to as a transparency mode. The mode information 530 and 535 may include the text information 530 on and/or the control lever 535 for the ambient mode supported by the wireless earphone. The user may recognize that the wireless earphone supports the ambient mode, and may control the operating state of the wireless earphone through the text information 530 on the mode. The control lever 535 may be referred to as a control UI for controlling a function of the wireless earphone. The smart watch 500 may switch the operating state of the wireless earphone by receiving a user input to the control lever 535. The user input to the control lever 535 may be performed by a user input corresponding to the UI of the control lever 535. For example, the user input may be a touch input to the control lever 535 by the user. When receiving the user input to the control lever 535, the smart watch 500 may move a circular indicator 537 positioned at the right side of the control lever 535 to the left side of the control lever 535. The smart watch 500 may receive the user input and transmit a control command to switch the operating state of the wireless earphone to the mobile phone 210. Then, after receiving the control command, the mobile phone 210 may transmit the received control command to the wireless earphone through the inter-device connection (e.g., the second inter-device connection 240 of FIG. 2). The wireless earphone may be switched to be in the normal mode from the ambient mode, in response to the received control command. For example, the wireless earphone operating in the ambient mode may be switched to operate in the normal mode, by changing the settings of the hardware and/or software related to the sound output, in response to the received control command. When the wireless earphone is operating in the normal mode, the user may listen to music output through the wireless earphone, and the ambient noise around the user may be blocked by the music output through the wireless earphone.

The audio source information 540 and 545 may further include information on the mobile phone connected to the wireless earphone through the second inter-device connection 240 which is the present inter-device connection. The audio source information 540 and 545 may include the device-related information on the third external electronic device which may form an inter-device connection with the wireless earphone. After receiving the first information from the mobile phone 210, the smart watch 500 may display the audio source information 540 and 545 of the wireless earphone, on the display 510. The audio source information 540 and 545 may include the text information 540 on the audio source of the wireless earphone and/or the icon 545 for selecting the audio source. The user may recognize that the control for changing the audio source of the wireless earphone may be performed, based on the text information 540 on the audio source. The icon 545 for selecting the audio source may be referred to as a control UI for controlling the function of the wireless earphone. The icon 545 for selecting the audio source may represent an electronic device to be connected to the wireless earphone, and may make an additional mark (e.g., a check mark, or an edge of an icon for an electronic device is highlighted) with respect to the electronic device which is current connected. The smart watch 500 may receive the user input to the icon 545 for selecting the audio source and may change the audio source of the wireless earphone. The user input to the icon 545 for selecting the audio source may be made through a user input corresponding to an UI of the icon 545 for selecting the audio source. For example, the user input may be a touch input to the icon 545 for selecting the audio source by the user. When receiving the user input to the icon 545 for selecting the audio source, the smart watch 500 may change the audio source of the wireless earphone to the third external electronic device, which is preset, and may provide an UI having an additional mark for the third external electronic device. For another example, when receiving the user input to the icon 545 for selecting the audio source, the smart watch 500 may display device-related information on the third external electronic device which may form an inter-device connection. The smart watch 500 may provide an UI, which allows a user to select the third external electronic device to form the inter-device connection together with the wireless earphone, together with the device-related information. The smart watch 500 may receive the user input to transmit a control command for switching the operating state of the wireless earphone to the mobile phone 210. The mobile phone 210 may transmit the control command, which is received through the second inter-device connection 240, to the wireless earphone, after receiving the control command. The audio source of the wireless earphone may be changed, depending on the received control command.

Figure 6:
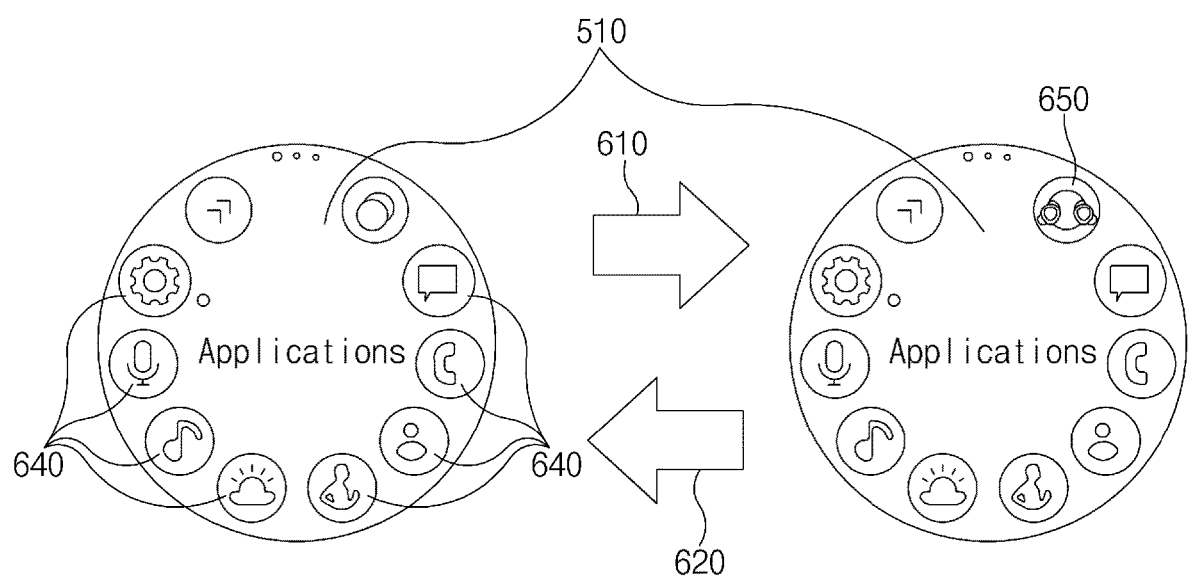
FIG. 6 illustrates an operation of displaying a graphic object in a wearable electronic device, according to an embodiment.

FIG. 6 illustrates an operation of displaying a graphic object in a wearable electronic device, according to an embodiment.

According to an embodiment, the display 510 (e.g., the display 320 of FIG. 3) of the smart watch 500 (e.g., the wearable electronic device 230 of FIG. 2) may display a plurality of applications, which are executable in the smart watch 500, in the form of at least one graphic object 640 (e.g., here, a plurality of graphic objects). The applications may be executed based on a user input to the at least one graphic object 640. For example, the at least one graphic object 640 may include at least one static image, at least one dynamic image, and/or an icon. For example, the at least one graphic object 640 may be provided to execute a settings function, a recording function, a music playback function, a weather information function, a biometric measuring function, a phone function, and/or a message function of the smart watch 500. For example, when the smart watch 500 receives the user input to the at least one graphic object 640, such that the weather information function is executed, the smart watch 500 may execute the weather application and display the weather information on the display 510 through the same.

According to an embodiment, at least a portion of the first information related to the wireless earphone (e.g., the second external electronic device 220 of FIG. 2), which is received by the smart watch 500 from the mobile phone (e.g., the first external electronic device 210 of FIG. 2) may be displayed on the display 510 through the graphic object 650. As illustrated In FIG. 6, the number and the shape of the graphic objects 650 are provided for illustrative purposes, and embodiments of the disclosure are not limited thereto.

According to an embodiment, the graphic object 650 representing the wireless earphone may be displayed on the display 510, when the mobile phone forms an inter-device connection (e.g., the second inter-device connection 240 of FIG. 2) with the wireless earphone. For example, the graphic object 650 may be displayed as the graphic object 650 is activated/deactivated. According to an embodiment, when the graphic object 650 is deactivated, then even when a user input is received with respect to the graphic object 650, the smart watch 500 omits execution of an application for controlling a function of the wireless earphone. When the graphic object 650 is deactivated, the graphic object 650 may be displayed in black and white to indicate to the user that the graphic object 650 is deactivated. According to an embodiment, when the graphic object 650 is activated, the graphic object 650 may be displayed in color. Then, when the user input to the graphic object 650 is received, the smart watch 500 may execute the application for controlling a function of the wireless earphone. For another example, displaying the graphic object 650 may include an operation of generating and removing the graphic object 650. Displaying the graphic object 650 is provided for illustrative purposes, and embodiments of the disclosure are not limited thereto.

According to an embodiment, first display switching 610 illustrates that the graphic object 650 is generated, when a connection between the mobile phone and the wireless earphone is formed. Second display switching 620 indicates that the graphic object 650 is removed, when the connection between the mobile phone and the wireless earphone is disconnected.

Figure 7A:
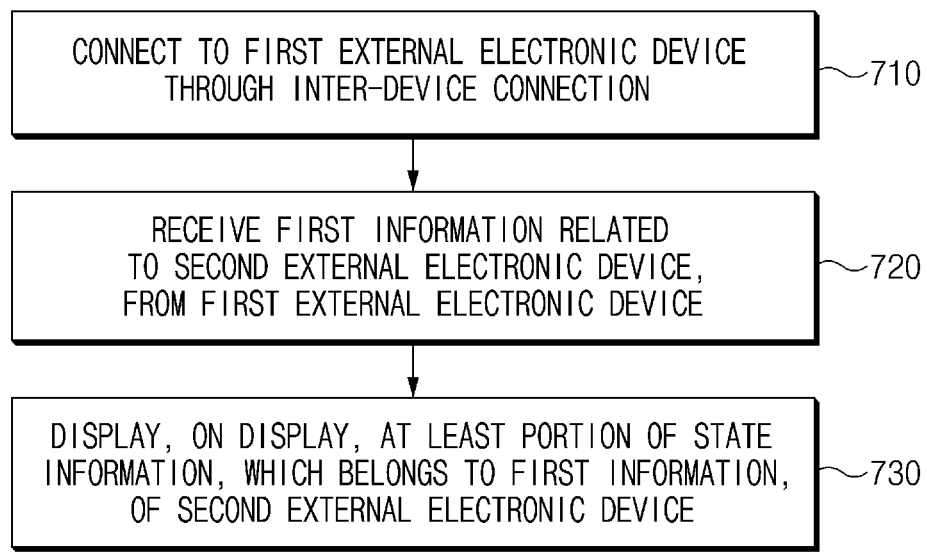
FIGS. 7A and 7B are flowcharts illustrating that a wearable electronic device identifies the state of another wearable electronic device or controls the another wearable electronic device, according to an embodiment.
Figure 7B:
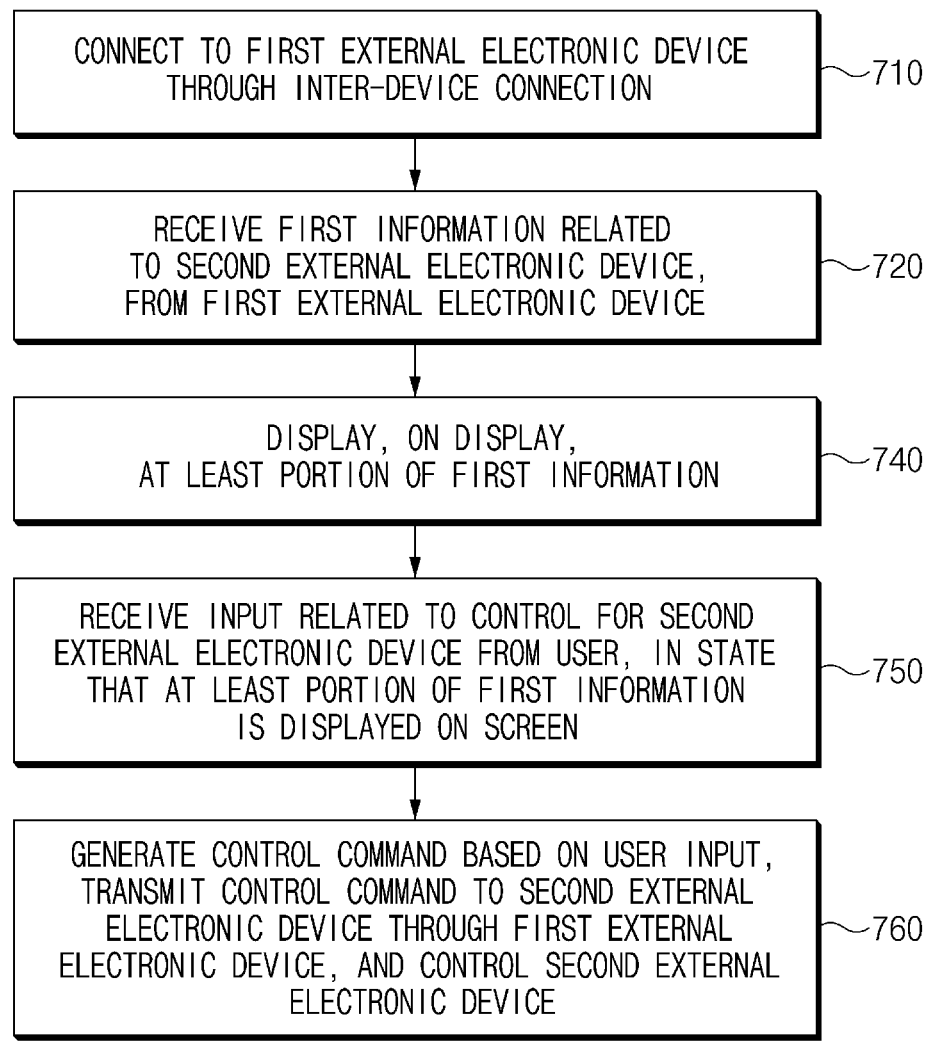

FIGS. 7A and 7B are flowcharts illustrating that a wearable electronic device identifies the state of another wearable electronic device or controls the another wearable electronic device, according to an embodiment.

Operations of FIGS. 7A and 7B may be performed by a processor (e.g., the processor 310 of FIG. 3) of the wearable electronic device 230.

Referring to FIG. 7A, in operation 710, the processor 310 may establish the first inter-device connection 250 with the first external electronic device 210 through the short-range communication circuit 330. According to an embodiment, the first external electronic device 210 may perform an operation of exchanging information with the wearable electronic device 230 or an operation of controlling the wearable electronic device 230, in response to establishing the connection with the wearable electronic device 230.

In operation 720, the processor 310 may receive the first information related to the second external electronic device 220 from the first external electronic device 210. The second external electronic device 220 may be communicatively connected to the first external electronic device 210 through the second inter-device connection 240. The first information may include device-related information and function-related information of the second external electronic device 220. For example, the device-related information may include a MAC address, a model number, a model name, and/or a manufacturer. For example, the function-related information may include information on the remaining battery capacity of the second external electronic device 220, information on the operating state, and/or information on a function to be performed. When the second external electronic device 220 is the wireless earphone, the information on a function, such as a function of reproducing and stopping a sound of the wireless earphone and a function of shifting on to the next song, may be included. The second inter-device connection 240 and the first inter-device connection 250 may be communication connections, based on the same short-range communication network or based on different short-range communication networks. For example, both the first inter-device connection 250 and the second inter-device connection 240 may be BT-based connections. In addition, the first inter-device connection 250 may be a BT-based connection, and the second inter-device connection 240 may be a WiFi-based connection.

According to an embodiment, the first external electronic device 210 may receive the first information from the second external electronic device 220. According to another embodiment, the first external electronic device 210 may receive the first information from a server, by using information (e.g., International Mobile Equipment Identify (IMEI) or account information) related to the second external electronic device 220.

The number of the wearable electronic device 230, the first external electronic device 210, and/or the second external electronic device 220 is provided for illustrative purposes, and an embodiment of the disclosure is not limited thereto. For example, the first external electronic device 210 may be connected to a plurality of second external electronic devices 220 through inter-device connections (e.g., the first inter-device connection 250 and the second inter-device connection 240 of FIG. 2), respectively. The processor 310 may receive information on the plurality of second external electronic devices 220. The processor 310 may receive the information on the plurality of second external electronic devices 220 and may perform operations of FIGS. 7A and 7B with respect to each of the plurality of second external electronic devices 220.

According to an embodiment, when the first external electronic device 210 is connected to at least one second external electronic device (e.g., the second external electronic device 220 of FIG. 2) through the first inter-device connection 250, the first external electronic device 210 may receive an application, a widget, or plug-in for controlling the second external electronic device 220 or for monitoring the state of the second external electronic device 220, by requesting the application, the widget, or the plug-in from a server (e.g., the server 108 of FIG. 1) or the second external electronic device 220. In addition, the first external electronic device 210 may transmit the application, the widget, or the plug-in to another second external electronic device 220 utilizing the application, the widget, or the plug-in.

According to an embodiment, when the second external electronic device 220 is connected to the first external electronic device 210 through the second inter-device connection 240, which is previously formed, or when the second inter-device connection 240 is disconnected between the second external electronic device 220 and the first external electronic device 210, the first external electronic device 210 may transmit information on the connection or the disconnection to the wearable electronic device 230. According to another embodiment, the wearable electronic device 230 may request the first external electronic device 210 to update information on other devices connected to the first external electronic device 210 through the inter-device connection, at a predetermined period. The wearable electronic device 230 may receive the updated information through the first inter-device connection 250. For example, the wearable electronic device 230 may receive the updated information to obtain state information of the second inter-device connection 240 between the second external electronic device 220 and the first external electronic device 210. Subsequently, in operation 730, the wearable electronic device 230 may control the display to display at least some of the state information included in the first information.

Operations 710 and 720 are illustrated to be sequentially performed for convenience of explanation. However, according to an embodiment, operations 710 and 720 may be performed simultaneously. According to another embodiment, operation 720 may be conditionally performed. For example, after operation 710, the processor 310 may perform operation 720 when the first external electronic device 210 and the second external electronic device 220 are connected through the second inter-device connection 240

According to an embodiment, although not illustrated, the state information of the second external electronic device 220 may include information such as information on the type of the second external electronic device 220 and the remaining battery capacity. The processor 310 may periodically receive the first information including state information (e.g., information on the remaining battery capacity) of the second external electronic device 220 from the first external electronic device 210, and may update a display (e.g., a battery gauge) of the state information of the second external electronic device 220, based on the first information.

Referring to FIG. 7B, operations 710, 720, and 730 may be described with reference to the descriptions of operations 710 and 720 of FIG. 7A. Accordingly, repeat descriptions of the same will not be repeated for the sake of brevity.

According to an embodiment, in operation 740, the processor 310 may display at least a portion of the first information, on the display 320. According to certain embodiments of the disclosure, the operation of displaying at least some of the first information on the display 320 may be an operation of displaying a visual object (e.g., a battery image) corresponding to information (e.g., a battery state) included in the first information. The visual object may include a simple visual object for displaying information and/or a UI that is an object of a user input.

The processor 310 may inform the user of an indication that the second external electronic device 220 may be controlled, before displaying the first information on the display 320. For example, a UI for indicating that a control operation may be performed may be displayed through a pop-up message. Alternatively, the processor 310 may display a UI (e.g., an icon) corresponding to information (e.g., an app, a widget, or a plug-in related to displaying a control operation and a status) of the second external electronic device 220 on an app list. When the user selects information on the second external electronic device 220, detailed information on the second external electronic device 220 may be displayed. For example, the information on the second external electronic device 220 may be activated after the processor 310 receives the first information, in the state that the information on the second external electronic device 220 is stored in a memory (e.g., the memory 340 of FIG. 3) of the wearable electronic device 230 while being previously deactivated. For example, the information on the second external electronic device 220 may be loaded in an executable state, into the memory (e.g., the memory 340 of FIG. 3) of the wearable electronic device 230. For another example, the information on the second external electronic device 220 may be received from the first external electronic device 210.

According to an embodiment, the processor 310 may receive information on the change in a state of the second external electronic device 220 or information on a function to be performed of the second external electronic device 220, from the first external electronic device 210. The processor 310 may display, for the user, the feedback on the result of the function performed, based on the received information. For example, when the processor 310 receives a user input and switches the operating state of the second external electronic device 220 (e.g., the wireless earphone) from an ambient mode to a normal mode, the processor 310 may receive first information including information that the second external electronic device 220 is switched to be in the normal mode, from the first external electronic device 210, and may display that the second external electronic device 220 is operating in the normal mode, based on the first information.

In operation 750, the processor 310 may receive a control-related input on the second external electronic device 220 from a user in the state that at least a portion of the first information is displayed on the display 320. For example, the control-related input may include a user touch to the display 320, an input to a user interface, a gesture input, and/or a voice input. For example, the user touch may be performed, as a user touches to the display 320. For example, the input to the user interface may be performed, as the user manipulates a physical key, a physical button, or a wheel attached to the wearable device 230. For example, the gesture input may be performed, as the user wearing the wearable electronic device 230 may perform a continuous operation, and the continuous operation may be sensed by the sensor (e.g., the sensor module 176 of FIG. 1; a gyro sensor, or an acceleration sensor) of the wearable electronic device 230. For example, the voice input may be performed, as an input device (e.g., the input device 150 of FIG. 1; a microphone) of the processor 310 receives a voice representing a specific control of a user, and the processor 310 (e.g., the processor 120 of FIG. 1) may interpret the received voice to generate a command. The description of the control-related input by the user is provided for illustrative purposes, and an embodiment of the disclosure is not limited thereto.

In operation 760, the processor 310 may generate a control command based on the user input. The processor 310 may transmit the control command to the second external electronic device 220 through the first external electronic device 210 to cause the second external electronic device 220 to execute the control command.

Figure 8:
FIG. 8 illustrates an operation of changing an audio source of another wearable electronic device by a wearable electronic device, according to an embodiment.

FIG. 8 illustrates an example operation of changing an audio source of another wearable electronic device using a wearable electronic device, according to an embodiment.

According to an embodiment, a mobile phone (e.g., the first external electronic device 210 of FIG. 2) may be simultaneously connected to the smart watch 500 (e.g., the wearable electronic device 230 of FIG. 2) and the wireless earphone (e.g., the second external electronic device 220 of FIG. 2) through the inter-device connection (e.g., the first inter-device connection 250 or the second inter-device connection 240 of FIG. 2) and through a network interface (e.g., the network interface 410 of FIG. 4).

According to an embodiment, the smart watch 500 may receive first information related to the wireless earphone, from the mobile phone through an inter-device connection. For example, the first information may include information indicating that the mobile phone is connected to the wireless earphone through a second inter-device connection (e.g., the second inter-device connection 240). For another example, the first information may further include device-related information such as a connection history to the wireless earphone. For another example, the first information may further include information related to devices to which the wireless earphone is presently connected through multiple connections.

According to an embodiment, the smart watch 500 may provide a user interface for switching the audio source of the wireless earphone through the display 510 (e.g., the display 320 of FIG. 3) of the smart watch 500, based on the first information.

According to an embodiment, the smart watch 500 may receive from the mobile phone second information, which is related to the third external electronic device, through an inter-device connection. The second information may include information (e.g., IMEI or account information) related to the third external electronic device having a connection history to the wireless earphone through the inter-device connection. The smart watch 500 may display, on the display 510, at least one third external electronic device information 810, 820, or 830 having the connection history to the wireless earphone, based on the second information.

According to an embodiment, the smart watch 500 may switch the audio source of the wireless earphone, based on the user input to the at least one third external electronic device information 810, 820, or 830. For example, the user input may be made through an operation of rotating a wheel 840 of the smart watch 500 (e.g., a mechanically rotating control ring). For example, the user input may be made through an operation in which the user touches the display 510. For example, the user input may be made through an operation in which the user touches an edge of the smart watch 500. The user input of FIG. 8 is provided for illustrative purposes, and an embodiment of the disclosure is not limited thereto.

The smart watch 500 may generate a control command allowing the wireless earphone to switch the device for the audio source to any one of the at least one third external electronic device, and may transmit the control command to the wireless earphone through the mobile phone. When the control command is transmitted to the wireless earphone, the wireless earphone may establish the inter-device connection with the third external electronic device. For example, when a user selects third external electronic device information 820 representing "Galaxy Tab S3" displayed on the display 510 by rotating the wheel 840 of the smart watch 500, the smart watch 500 may transmit, to the mobile phone, the control command for switching the audio source of the wireless earphone to "Galaxy Tab S3" which is the third external electronic device. The wireless earphone may receive the control command from the mobile phone and may switch the audio source to "Galaxy Tab S3". For example, the wireless earphone may then establish the inter-device connection with "Galaxy Tab S3", and output audio data generated from an audio signal received from the device "Galaxy Tab S3".

According to an embodiment, the display of at least one third external electronic device information 810, 820, and 830 may be related to account information associated with the mobile phone. For example, the second information may include device-related information registered in an account associated with the mobile phone. The smart watch 500 may receive the first information and the second information from the mobile phone, and compare the first information with the second information. For example, the smart watch 500 may compare the first information with the second information, and identify based on the comparison at least one third external electronic device that has a connection history to the wireless earphone, that is also registered to the account associated with the mobile phone. The smart watch 500 may display, on the display 510, information on the identified at least one third external electronic device. For another example, the mobile phone may identify the at least one third external electronic device including the connection history to the wireless earphone and registered in the account associated with the mobile phone. The second information may include information related to the at least one third external electronic device identified. The smart watch 500 may receive the second information and may display, on the display 510, the information on the electronic device having the connection history to the wireless earphone and registered in the account associated with the mobile phone.

The number and the type of at least one third external electronic device information 810, 820, or 830 of FIG. 8 are provided for illustrative purposes, and an embodiment of the disclosure is not limited thereto.

Figure 9:
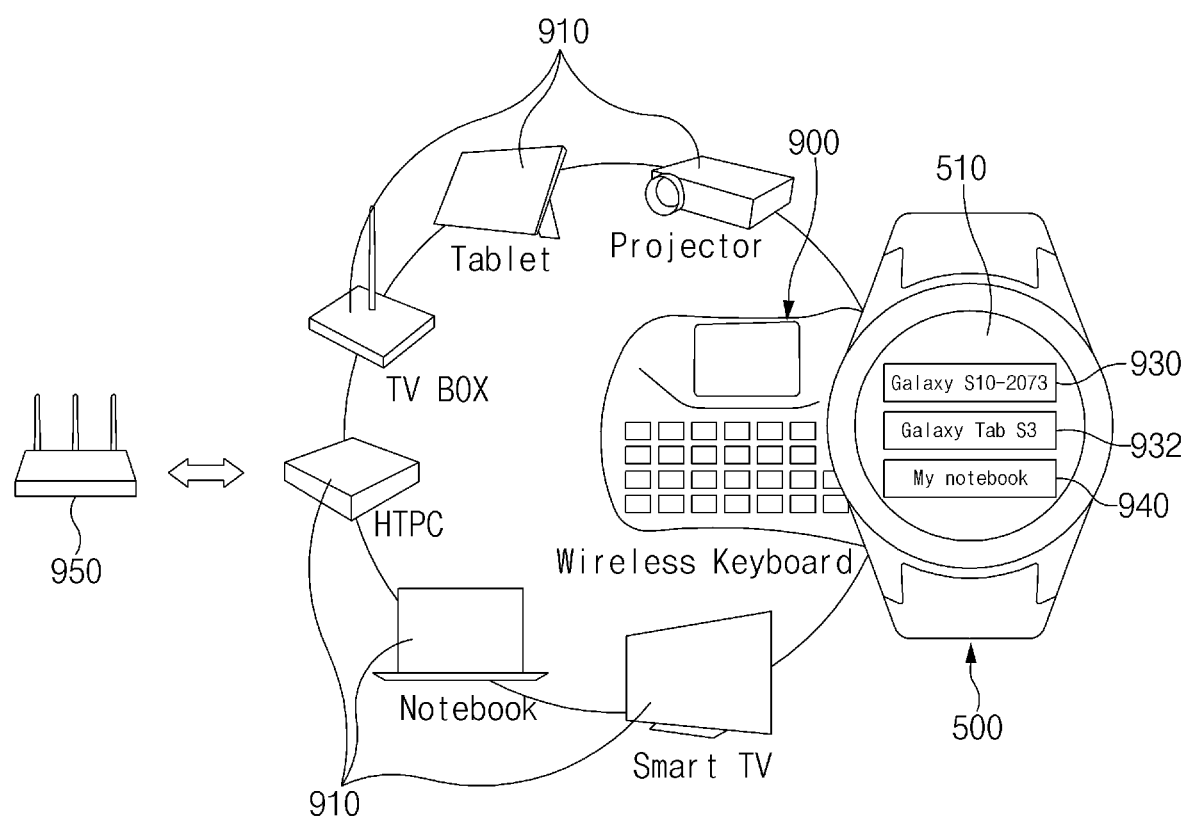
FIG. 9 is a view illustrating an operation in which a wearable electronic device changes a connection device of an external input device, according to an embodiment.

FIG. 9 is a view illustrating an operation in which inputs to a wearable electronic device may control which external device is remotely controlled by an external input device.

According to an embodiment, the mobile phone (e.g., the first external electronic device 210 of FIG. 2) may be simultaneously connected to the smart watch 500 (e.g., the wearable electronic device 230 of FIG. 2) and a wireless keyboard 900 through the inter-device connection (e.g., the inter-device connections 240 and 250 of FIG. 2), using a network interface (e.g., the network interface 410 of FIG. 4).

According to an embodiment, the smart watch 500 may receive first information related to the wireless keyboard 900, from the mobile phone through an inter-device connection. For example, the first information may include information indicating that the mobile phone is connected to the wireless keyboard 900 through the inter-device connection.

According to an embodiment, the smart watch 500 may provide, to the user, an UI that is interactable so as to change a connection device of the wireless keyboard 900 on the display 510 (e.g., the display 320 of FIG. 3) of the smart watch 500, based on the first information.

According to an embodiment, the smart watch 500 may receive second information, which is related to at least one third external electronic device 910, from the mobile phone, through an inter-device connection. For example, the second information may include device-related information registered in an account associated with the mobile phone. For another example, the second information may further include information related to a device positioned in the same space by accessing the same WiFi access point 950 as that of the mobile phone and received from the server.

According to an embodiment, the smart watch 500 may receive the first information and the second information from the mobile phone and may compare the first information and the second information with each other. For example, the smart watch 500 may compare the first information and the second information, and may identify information on at least one third external electronic device, which is registered in an account associated with the mobile phone or accesses the same WIFI AP 950, of the at least one third electronic device information 930, 932, or 934. The smart watch 500 may display, on the display 510, information on the at least one third external electronic device information identified. For another example, the mobile phone may identify at least one third external electronic device which is registered in an account associated with the mobile phone or accesses the same WiFi AP 950 as that of the mobile phone. The second information may include information related to the at least one third external electronic device identified. The smart watch 500 may receive the second information and may display, on a screen, information of the at least one third electronic device which is registered in an account associated with the mobile phone or accesses the same WiFi AP 950 as that of the mobile phone. The number and the type of at least one third external electronic device information 930, 932, or 934 of FIG. 9 are provided for illustrative purposes, and an embodiment of the disclosure is not limited thereto.

According to an embodiment, the smart watch 500 may change the connection device of the wireless keyboard 900, based on the user input to the at least one third external electronic device information 930, 932, or 934. For example, the user input may be generated through an operation of rotating a wheel (e.g., the mechanical rotary wheel 840 of FIG. 8) of the smart watch 500. For example, the user input may be made through an operation in which the user generates a touch input through the touch-enabled display 510. For example, the user input may be made through an operation in which the user touches a touch-input sensitive edge of the smart watch 500. The user input of FIG. 9 is provided for illustrative purposes, and an embodiment of the disclosure is not limited thereto.

According to an embodiment, when the input is entered by the user, a command for changing the connection device of the wireless keyboard 900 is transmitted to the wireless keyboard 900, whereupon the wireless keyboard 900 may establish an inter-device connection with the third external electronic device 910, as per the user input. For example, when a user selects the third external electronic device information 932 representing "Galaxy Tab S3" displayed on the display 510 by rotating the wheel (e.g., reference numeral 840 of FIG. 8) of the smart watch 500, the smart watch 500 may transmit, to the mobile phone, the control command for switching the connection device of the wireless keyboard 900 to "Galaxy Tab S3" which is the third external electronic device. The wireless keyboard 900 may receive the control command from the mobile phone and may change the connection device to "Galaxy Tab S3". For example, "Galaxy Tab S3" may form the inter-device connection with the wireless keyboard 900, may receive keyboard input information from the wireless keyboard 900, and may display the keyboard input information through a display device (e.g., reference numeral 160 of FIG. 1) of "Galaxy Tab S3".

Figure 10:
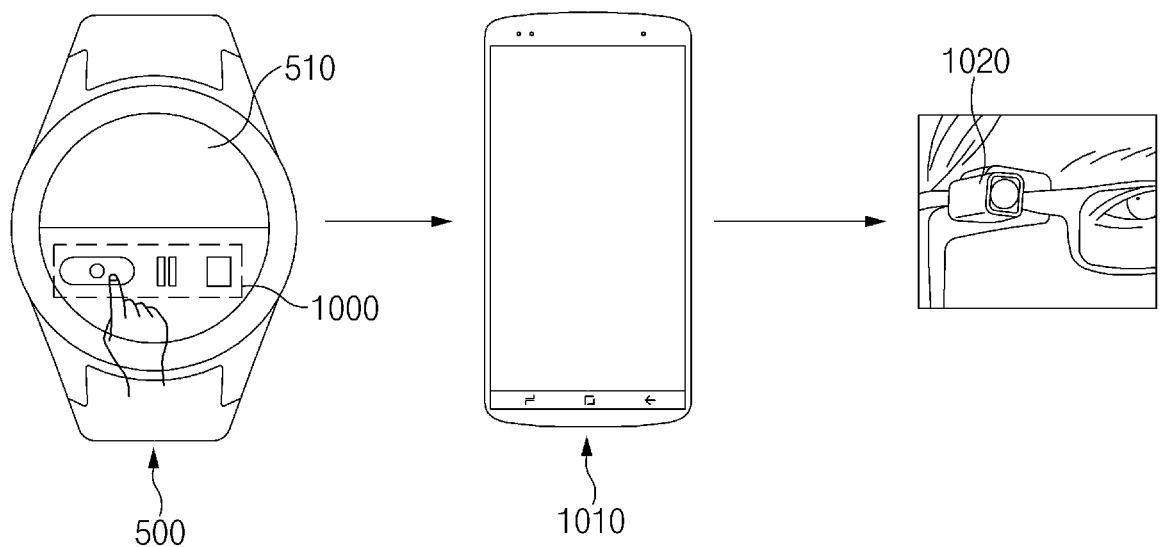
FIG. 10 is a view illustrating a method in which a wearable electronic device controls another wearable electronic device, according to an embodiment.

FIG. 10 is a view illustrating a method in which a wearable electronic device controls another wearable electronic device, according to an embodiment.

According to an embodiment, the smart watch 500 (e.g., the wearable electronic device 230 of FIG. 2) may receive first information related to a wearable cam device 1020 (e.g., the second external electronic device 220 of FIG. 2) from a mobile phone 1010 (e.g., the first external electronic device 210 of FIG. 2) connected through an inter-device connection (e.g., the first inter-device connection 250 of FIG. 2).

According to an embodiment, the smart watch 500 may display, on the display 510 (e.g., the display 320 of FIG. 3), an UI 1000 for controlling one or more functions of the wearable cam device 1020, based on the first information. The smart watch 500 may transmit, to the mobile phone 1010, a command for controlling the wearable cam device 1020, based on a user input to the UI 1000 displayed on the display 510. For example, the smart watch 500 may transmit, to the mobile phone 1010, a control command requesting initiation of recording, pausing of recording, or termination of recording by the wearable cam device 1020.

Figure 11:
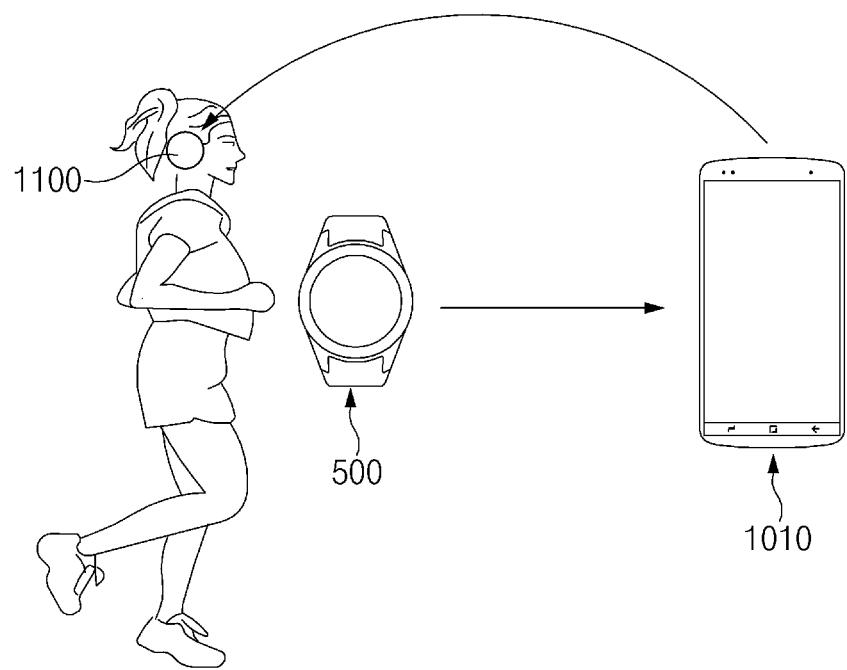
FIG. 11 is a view illustrating a method in which a wearable electronic device changes the mode of another wearable electronic device, according to an embodiment.

FIG. 11 is a view illustrating a method in which a wearable electronic device changes the mode of another wearable electronic device, according to an embodiment.

Components of reference numerals of FIG. 11, which correspond to reference numerals of FIGS. 1 to 10, may be understood by those skilled in the art, by making reference to the description of the relevant components of the reference numerals of FIGS. 1 to 10.

According to an embodiment, the smart watch 500 may include a sensor (not illustrated) (e.g., the sensor module 176 of FIG. 1). The sensor may detect an external environment state (e.g., a user state), and may generate an electric signal or a data value corresponding to the detect user state. For example, the sensor may include a gesture sensor, a gyro sensor, an atmospheric pressure sensor, a magnetic sensor, an acceleration sensor, a grip sensor, a proximity sensor, a color sensor, an infrared sensor, a biometric sensor, a temperature sensor, a humidity sensor, or an illuminance sensor. The smart watch 500 may sense the user state by using the sensor. For example, the smart watch 500 may sense that the user is performing outdoor activities (e.g., riding a bicycle), by using the sensor.

According to an embodiment, the smart watch 500 (e.g., the wearable electronic device 230 of FIG. 2) may receive first information related to a wireless earphone 1100 (e.g., the second external electronic device 220 of FIG. 2) from the mobile phone 1010 (e.g., the first external electronic device 210 of FIG. 2) connected through an inter-device connection (e.g., the first inter-device connection 250 of FIG. 2). For example, the first information may include information related to a mode of the wireless earphone 1100. For example, the mode may include a transparency mode and/or an ambient mode. For example, while the smart watch 500 is operating in the ambient mode, the user may hear not only music output through the wireless earphone, but also ambient noise from the environment around the user. The ambient mode may also be referred to as a transparency mode. The mode of FIG. 11 is provided for illustrative purposes, and an embodiment of the disclosure is not limited thereto.

According to an embodiment, the smart watch 500 may generate a control command for changing a mode of the wireless earphone 1100, based on a user state and the first information.

According to an embodiment, the smart watch 500 may display a UI related to a mode change on the display 510. For example, the generated UI related to the mode change may be referred to as an ambient mode UI 530 of FIG. 5. The smart watch 500 may receive a user input to the UI through a display, and may transmit a control command for changing a mode of the wireless earphone 1100, to the mobile phone 1010.

According to an embodiment, the smart watch 500 may transmit the control command for changing the mode to the mobile phone 1010, instead of displaying the UI related to the mode change on the display 510. For example, the smart watch 500 may detect the user state using the sensor, and transmit the control command for changing the mode of the wireless earphone 1100 to the mobile phone 1010. For example, when the user is engaged in some outdoor activity (e.g., riding a bicycle), the smart watch 500 may transmit a control command for causing the wireless earphone 1100 to operate in transparency mode, to the mobile phone 1010.

Figure 12A:
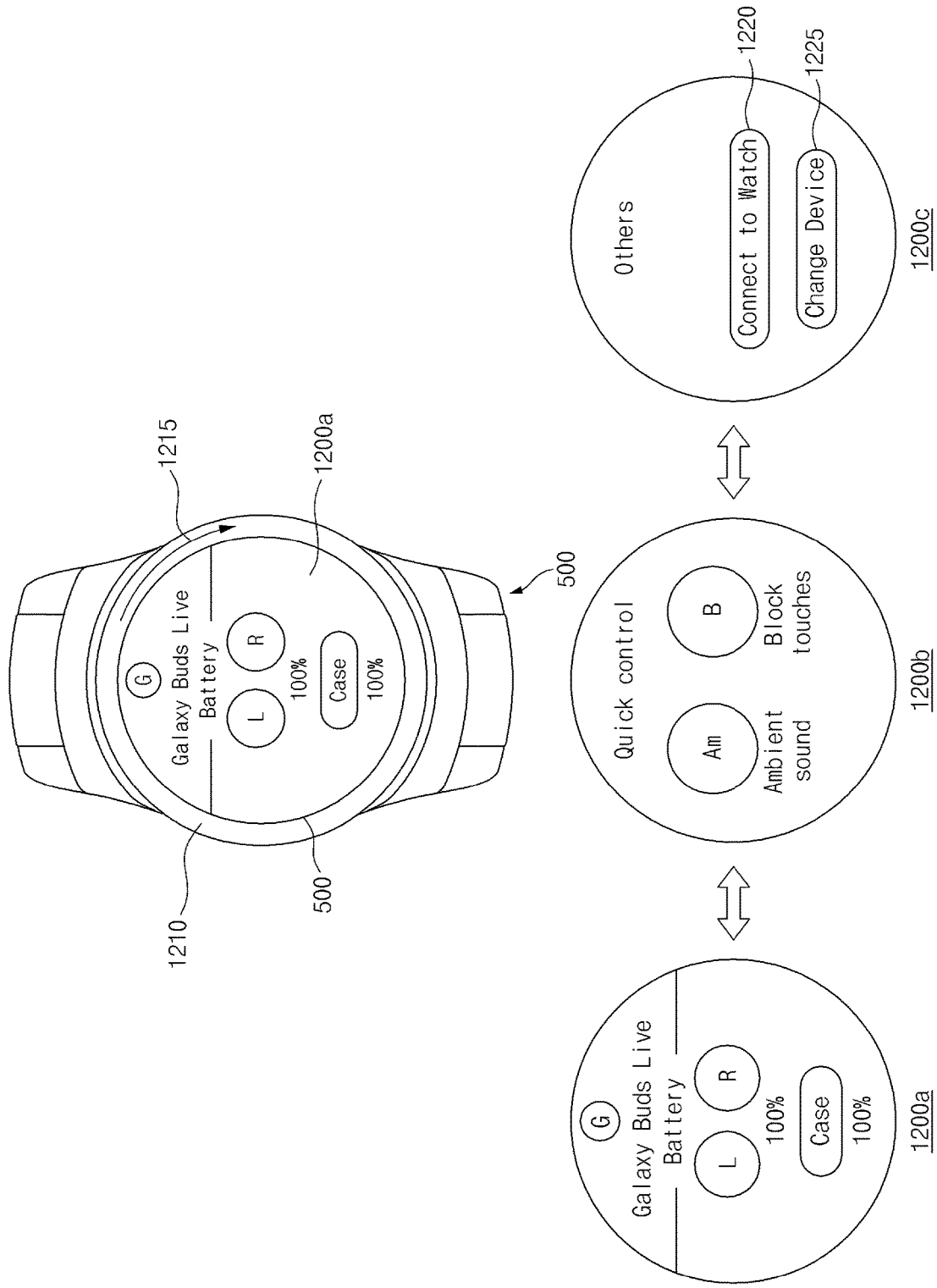
FIG. 12A is a view illustrating an application execution screen of a wearable electronic device, according to various embodiments.
Figure 12B:
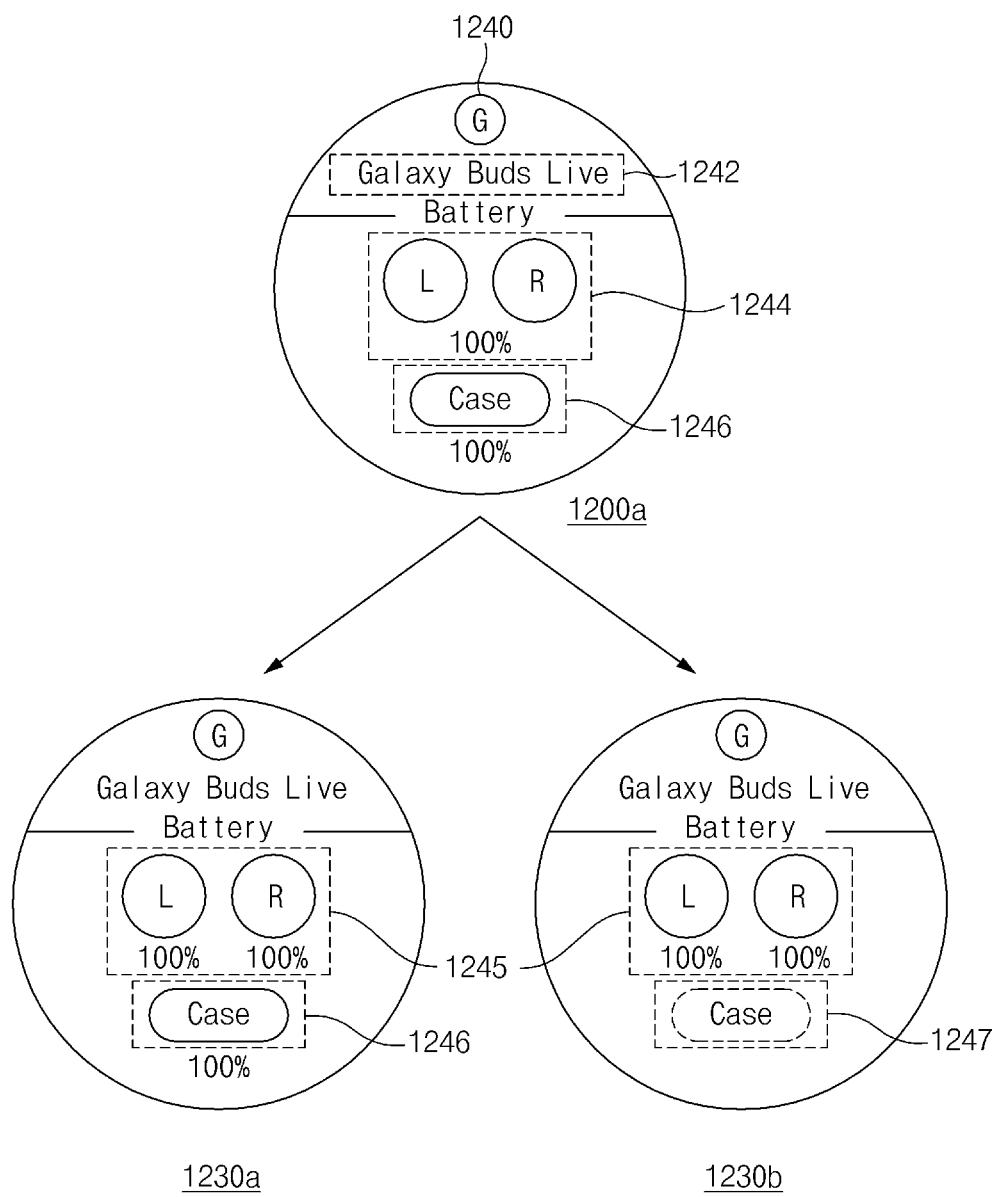
FIG. 12B is a view illustrating an application execution screen of a wearable electronic device, according to various embodiments.
Figure 12C:
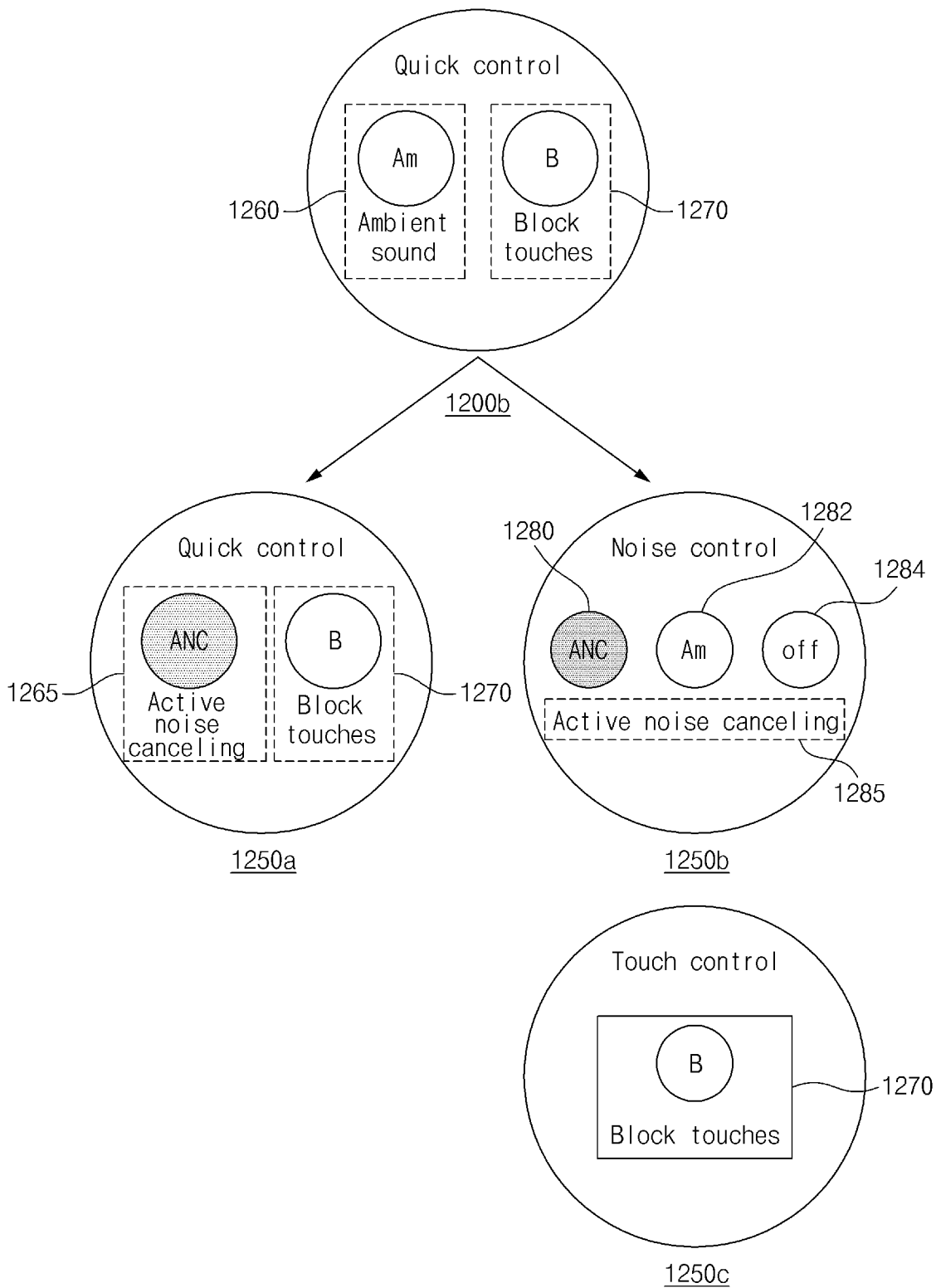
FIG. 12C is a view illustrating an application execution screen of a wearable electronic device, according to various embodiments.

FIG. 12A is a view illustrating an application execution screen of a wearable electronic device, according to various embodiments. FIG. 12B is a view illustrating an application execution screen of a wearable electronic device, according to various embodiments. FIG. 12C is a view illustrating an application execution screen of a wearable electronic device, according to various embodiments.

According to an embodiment, the smart watch 500 (e.g., the application 146 of FIG. 1) may execute an application (e.g., the second external electronic device support module 440) for providing a function and information associated with a wireless earphone (e.g., the second external electronic device 220 of FIG. 2). According to an embodiment, the smart watch 500 may display an application execution screen 1200a through the display 510.

According to an embodiment, the smart watch 500 may switch a screen (e.g., reference numeral 1200a), which is being displayed on the display 510, to another screen (e.g., reference numeral 1200b or 1200c) in response to a user input 1215. For example, the user input 1215 may be an operation of rotating a wheel 1210 of the smart watch 500 by a user. The smart watch 500 may display, on the display 510, a screen (e.g., reference numeral 1200b or 1200c), which corresponds to a rotation degree of the wheel 1210, based on the rotation degree of the wheel 1210.

According to an embodiment, the screen 1200a may provide the information on the battery of the wireless earphone. The screen 1200a is provided by way of example of a screen for providing the information on the battery, but an embodiment of the disclosure is not limited thereto. For example, referring to FIG. 12B, the smart watch 500 may substitute the screen 1200a with a screen 1230a or a screen 1230b to provide the information on the battery to the display 510.

Referring to FIG. 12B, in the screen 1200a, the smart watch 500 may display, through the display 510, at least one graphic object 1240, 1242, 1244, or 1246 including information associated with the wireless earphone. According to an embodiment, the graphic object 1240 may contain information on an electronic device (e.g., the first external electronic device 210 or the smart watch 500 of FIG. 2) having an inter-device connection formed with the wireless earphone. For example, the graphic object 1240 may contain a device name of the electronic device having the inter-device connection formed with the wireless earphone. According to an embodiment, the graphic object 1242 may show a device name of the wireless earphone. For example, the device name may be a model name of the wireless earphone. For another example, the device name may be an arbitrary name set by a user.

According to an embodiment, the graphic object 1244 may contain information on the battery of the wireless earphone. For example, the smart watch 500 may display, as one gauge, remaining battery capacities of a left unit and a right unit of the wireless earphone as shown in the form of the graphic object 1244. In this case, the smart watch 500 may display the sum of battery capacities, on the assumption that the battery capacity is 100% when batteries of the left unit and the right unit are fully charged.

Referring to the screens 1230a and 1230b, the smart watch 500 may individually display battery capacities of both units of the wireless earphone, as shown in the form of the graphic object 1245.

According to an embodiment, both units of the wireless earphone may be received in a case and charged. The both units and the case of the wireless earphone may be individually equipped with embedded-type batteries. The graphic objects 1246 and 1247 may contain information on batteries of cases receiving both units of the wireless earphone. According to an embodiment, the remaining battery capacity of each case may be recognized under a specific condition. For example, when the case is closed, the smart watch 500 may not receive information on the battery of the case, from the wireless earphone or the external electronic device (e.g., reference numeral 210 of FIG. 1) having the inter-device connection formed with the wireless earphone. When the case is open, and when at least one of both units of the wireless earphone is mounted at a specific position of the case, the smart watch 500 may receive information on the battery of the case, from the relevant unit or an external electronic device having the inter-device connection with the relevant unit. According to an embodiment, when the smart watch 500 may not receive the information on the battery of the case, the smart watch 500 may display the graphic object 1242 to be dimmed or with a dotted line, as shown in the form of the graphic object 1247 of the screen 1230*b*.

Referring to FIG. 12A again, the screen 1200*b* may provide a quick control function. The smart watch 500 may generate a control command for controlling the function of the wireless earphone by receiving a user input to the screen 1200*b*. According to an embodiment, when the smart watch 500 forms the inter-device connection with the external electronic device, the smart watch 500 may transmit the control command to the external electronic device. The external electronic device may transmit the received control command to the wireless earphone. According to an embodiment, when the smart watch 500 directly forms an inter-device connection with the wireless earphone, the smart watch 500 may directly transmit the control command to the wireless earphone. The screen 1200*b* is provided by way of example of a screen for providing the quick control function, but the embodiment of the disclosure is not limited thereto.

Referring to FIG. 12C, the smart watch 500 may substitute the screen 1200*b* with a screen 1250*a* or a screen 1250*b* or 1250*c* to provide the quick control function.

The screen 1200*b* may include graphic objects 1260 and 1270 corresponding to at least one of functions of the wireless earphone. The smart watch 500 may provide functions corresponding to the graphic objects 1260 and 1270 by receiving user inputs to the graphic objects 1260 and 1270.

According to an embodiment, the smart watch 500 may provide an ambient sound mode by receiving the user input to the graphic object 1260. For example, the user, who wears the wireless earphone, may hear external noise together with a sound output from the wireless earphone in the ambient sound mode. The smart watch 500 may deactivate a touch input to the wireless earphone by receiving the user input to the graphic object 1270. In this case, the wireless earphone may ignore the user input (e.g., the touch input) received through the touch panel. According to an embodiment, the graphic objects 1260 and 1270 may be provided in a toggle form. For example, when receiving the user input to the graphic object 1260, the smart watch 500 may generate a control command allowing the wireless earphone to operate in the ambient sound mode and may change the indication of the graphic object 1260. For example, the smart watch 500 may shade an icon of the graphic object 1260. According to an embodiment, the smart watch 500 may form an inter-device connection with any one of the wireless earphone or the external electronic device. The smart watch 500 may directly transmit a control command generated to the wireless earphone or transmit the control command to the external electronic device, depending on the inter-device connection state.

Referring to the screen 1250*a*, the smart watch 500 may provide another function of the wireless earphone through "Quick control". According to an embodiment, when the wireless earphone supports an active noise canceling function, the smart watch 500 may provide the graphic object 1265 corresponding to the active noise canceling function. The active noise canceling function may a function in which the wireless earphone actively cancels the noise around the user. For example, the wireless earphone may analyze the waveform of the external noise by using a sensor (e.g., the sensor module 176 of FIG. 1), and may transmit a signal having a waveform inverse to the waveform to cancel the external noise.

Referring to the screens 1250*b* and 1250*c*, the smart watch 500 may divide functions provided on the screen 1250*a* into a noise control screen and a touch screen, such that the divided functions are provided to the noise control screen and the touch screen, respectively. The smart watch 500 may receive the user input 1215 to the wheel 1210 to switch from the noise control screen to the touch control screen or to switch from the touch control screen to the noise control screen. In the screen 1250*b*, the smart watch 500 may include a graphic object 1280 corresponding to an ambient sound mode, a graphic object 1282 corresponding to an active noise canceling function, and/or a graphic object 1284 corresponding to a noise control off. The smart watch 500 may control the operating state of the wireless earphone by receiving a user input to the graphic object 1280, 1282, or 1284. The graphic object 1285 may be shown the current operating state of the wireless earphone. The screen 1250*c* may include the graphic object 1270 corresponding to a function of deactivating a touch of the wireless earphone.

Referring to FIG. 12A again, the screen 1200*c* may include a graphic object corresponding to other functions associated with the wireless earphone. According to an embodiment, the screen 1200*c* may include graphic objects 1220 and 1225 for setting the inter-device connection with the wireless earphone. According to an embodiment, the smart watch 500 may directly form the inter-device connection with the wireless earphone by receiving a user input to the graphic object 1220. For example, the smart watch 500 may generate a control command based on the user input to the graphic object 1220. The smart watch 500 may transmit the control command to the external electronic device. The external electronic device may transmit the received control command to the wireless earphone. The wireless earphone may release the inter-device connection with the external electronic device based on the received control command, and may form the inter-device connection with the smart watch 500. According to an embodiment, the smart watch 500 may change the external electronic device having the inter-device connection with the wireless earphone to another external electronic device by receiving a user input to the graphic object 1225. The description on a method for changing the inter-device connection between the wireless earphone and a plurality of external electronic devices may be understood by making reference to the description made with reference to FIG. 8.

According to an embodiment, when the smart watch 500 forms the inter-device connection with the wireless earphone, the smart watch 500 may directly receive information, which is associated with the wireless earphone, from the wireless earphone through the inter-device connection. Alternatively, the smart watch 500 may transmit the control command for executing a function of the wireless earphone to the wireless earphone through the inter-device connection.

According to an embodiment, when the smart watch 500 forms the inter-device connection with the external electronic device (e.g., the first external electronic device 210 of FIG. 2), the smart watch 500 may receive information associated with the wireless earphone through the external electronic device. Alternatively, the smart watch 500 may transmit the control command for executing a function of the wireless earphone to the wireless earphone through the external electronic device.

Figure 13:
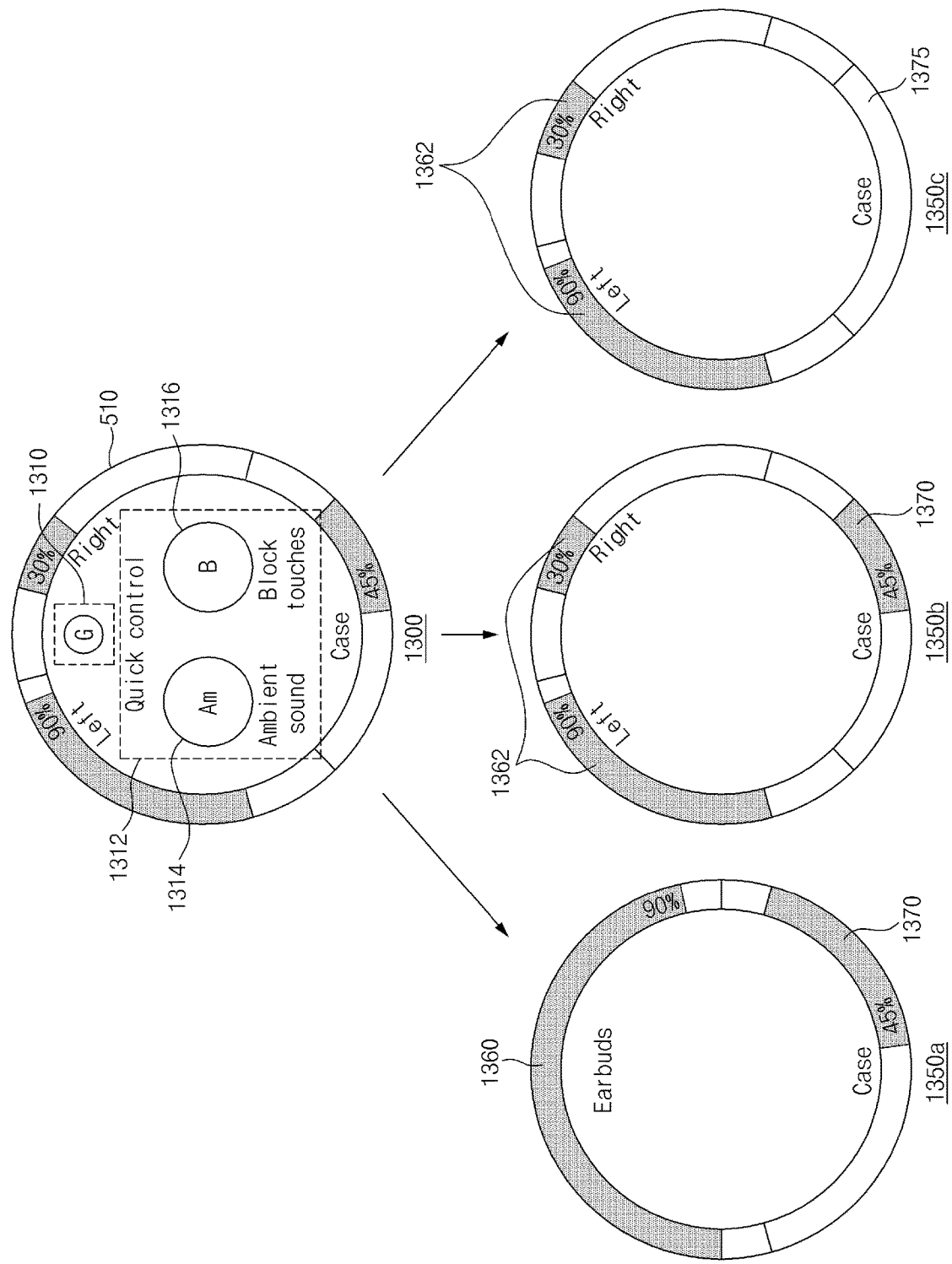
FIG. 13 is a view illustrating a widget screen of a wearable electronic device, according to an embodiment.

FIG. 13 is a view illustrating a widget screen of a wearable electronic device, according to an embodiment.

A smart watch (e.g., the smart watch 500 of FIG. 5) may display a widget including a graphic object, which corresponds to information on a wireless earphone (e.g., the second external electronic device 220 of FIG. 2) and a function of the wireless earphone, to the display 510, based on user settings. The screen 1300 may illustrate a widget screen provided by the smart watch 500. For example, the widget may provide at least one of the information and the function, which are provided by the application of FIG. 12A, through one screen. The information and the function provided by the widget may be set by the user or set based on a user history of the user.

The screen 1300 may include at least one graphic object 1310 or 1312. According to an embodiment, the graphic object 1310 may include information on an electronic device (e.g., the first external electronic device 210 or the smart watch 500 of FIG. 2) having an inter-device connection formed with the wireless earphone. According to an embodiment, the graphic object 1312 may correspond to the Quick control function. The description on the Quick control function may be understood by making reference to the description made with reference to FIG. 12C. The smart watch 500 may receive user inputs to the icons 1314 and 1316 included in the graphic object 1312 to generate a control command for the user input. According to an embodiment, the smart watch 500 may form an inter-device connection with any one of the wireless earphone or the external electronic device. The smart watch 500 may directly transmit a control command to the wireless earphone or the eternal electronic device (e.g., the first external electronic device 210 of FIG. 2), depending on the inter-device connection state.

According to an embodiment, the screen 1300 may further include information on a battery of the wireless earphone. For example, the smart watch 500 may display the information on the battery of the wireless earphone at an edge of the screen 1300 except for the graphic object 1310 or 1312. The battery information may be displayed through various manners. For example, the smart watch 500 may display the information on the battery of the wireless earphone together with reference numerals 1350*a*, 1350*b*, and 1350*c*.

In reference numeral 1350*a*, the smart watch 500 may display, in the form of one gage, the sum of battery capacities of a left unit and a right unit of the wireless earphone, as shown in the form of the graphic object 1360. The smart watch 500 may simultaneously display the graphic object 1360 and a device name (Earbuds) of the wireless earphone.

In reference numeral 1350*a* and 1350*c*, the smart watch 500 may separately display remaining battery capacities of a left unit and a right unit of the wireless earphone, as shown in the form of the graphic object 1362.

In reference numeral 1350*a* and 1350*b*, the smart watch 500 may display a remaining battery capacity of the case of the wireless earphone, in the form of the graphic object 1370.

In reference numeral 1350*c*, the smart watch 500 may display the gauge of the remaining battery capacity of the case to be dimmed, as shown in the form of the graphic object 1375, when the remaining battery capacity of the case is not recognized. The description on that the remaining battery capacity of the case is not recognized may be understood to make reference to the description made with reference to FIG. 12B.

What is claimed is:

1. A wearable electronic device, comprising:
a short-range communication circuit;
memory;
a display; and
a processor operatively coupled to the short-range communication circuit, the memory and the display, wherein the memory stores one or more instructions that, when executed by the processor, cause the wearable electronic device to:
establish a first communicative connection with a first external electronic device via the short-range communication circuit;
receive, via the short-range communication circuit, from the first external electronic device, first information related to a second external electronic device that is communicatively connected to the first external electronic device through a second connection;
control the display to display a graphic object associated with an operation for controlling the second external electronic device based on at least a portion of the received first information; and
transmit, to the second external electronic device through the first external electronic device, a control command for the second external electronic device, based on receiving a user input to graphic object displayed on the display,
wherein the graphic object includes:
a first graphic object for controlling a mode of the second external electronic device, and
a second graphic object for controlling a communicative connection of the second external electronic device.

2. The wearable electronic device of claim 1, wherein the first information includes device-related information or function-related information of the second external electronic device,
wherein the device-related information includes information on a media access control (MAC) address, a model number, a model name, or a manufacturer, and
wherein the function-related information includes a battery level, an operating state, or information on a function to be performed.

3. The wearable electronic device of claim 1, wherein the instructions that, when executed by the processor, cause the wearable electronic device to:
display any one of the first graphic object and the second graphic object on the display;
display the other of the first graphic object and the second graphic object on the display, based on a user input.

4. The wearable electronic device of claim 1, wherein the instructions that, when executed by the processor, cause the wearable electronic device to:

receive second information related to at least one third external electronic device from the first external electronic device;

control the display to display the graphic object based on the first information or the second information.

5. The wearable electronic device of claim 4, wherein the instructions that, when executed by the processor, cause the wearable electronic device to:

transmit, to the second external electronic device, a control command for forming a communicative connection between the second external electronic device and the at least one third external electronic device, through the short-range communication circuit, based on receiving a user input to the second graphic object.

6. The wearable electronic device of claim 4, wherein the first information includes device-related information, including a connection history to the second external electronic device, wherein the second information includes device-related information registered in an account associated with the first external electronic device.

7. The wearable electronic device of claim 1, wherein the second external electronic device includes an audio output device or an audio input device.

8. The wearable electronic device of claim 1, wherein the wearable electronic device further includes a sensor, wherein the instructions that, when executed by the processor, cause the wearable electronic device to:

detect a state of a user using the sensor; and control the display to display the first graphic object, based on the detected state of the user.

9. The wearable electronic device of claim 1, wherein the wearable electronic device further includes a sensor;

wherein the instructions that, when executed by the processor, cause the electronic device to:

detect a state of a user using the sensor; and transmit, to the second external electronic device, a control command for changing the mode of the second external electronic device, based on the detected state of the user.

10. A method for operating a wearable electronic device, the method comprising:

establishing a first communicative connection to a first external electronic device, via a short-range communication circuit;

receiving, via the short-range communication circuit, from the first external electronic device, first information related to a second external electronic device that is communicatively connected to the first external electronic device through a second communicative connection;

displaying, on a display, a graphic object associated with an operation for controlling the second external electronic device based on at least a portion of the received first information; and transmitting, to the second external electronic device through the first external electronic device, a control command for the second external electronic device, based on receiving a user input to graphic object displayed on the display, wherein the graphic object includes:

a first graphic object for controlling a mode of the second external electronic device, and a second graphic object for controlling a communicative connection of the second external electronic device.

11. The method of claim 10, wherein the first information includes device-related information or function-related information of the second external electronic device, wherein the device-related information includes information on a media access control (MAC) address, a model number, a model name, or a manufacturer, and wherein the function-related information includes a battery level, an operating state, or information on a function to be performed.

12. The method of claim 10, further comprising:

displaying any one of the first graphic object and the second graphic object on the display, and displaying the other of the first graphic object and the second graphic object on the display, based on a user input.

13. The method of claim 10, further comprising:

receiving second information related to at least one third external electronic device from the first external electronic device;

displaying the graphic object based on the first information or the second information.

14. The method of claim 10, further comprising:

transmitting, to the second external electronic device, a control command for forming a communicative connection between the second external electronic device and at least one third external electronic device, through the short-range communication circuit, based on receiving a user input to the second graphic object.

15. The method of claim 14, wherein the first information includes device-related information including a connection history to the second external electronic device, wherein the second information includes device-related information registered in an account associated with the first external electronic device.

16. The method of claim 10, wherein the second external electronic device includes an audio output device or an audio input device.

17. The method of claim 10, wherein the wearable electronic device further includes a sensor, wherein the method further comprises:

detecting a state of a user using the sensor; and displaying on the display the first graphic object, based on the detected state of the user.

18. The method of claim 10, wherein the wearable electronic device further includes a sensor;

wherein the method further comprises:

detecting a state of a user using the sensor; and transmitting, to the second external electronic device, a control command for changing the mode of the second external electronic device, based on the detected state of the user.

19. A non-transitory computer readable medium storing programming instructions executable by a processor to cause an electronic device to:

establish a first communicative connection with a first external electronic device via a short-range communication circuit;

receive, via the short-range communication circuit, from the first external electronic device, first information related to a second external electronic device that is communicatively connected to the first external electronic device through a second connection;

control a display to display a graphic object associated with an operation for controlling the second external electronic device based on at least a portion of the received first information; and transmit, to the second external electronic device through the first external electronic device, a control command for the second external electronic device, based on receiving a user input to graphic object displayed on the display, wherein the graphic object includes:

a first graphic object for controlling a mode of the second external electronic device, and a second graphic object for controlling a communicative connection of the second external electronic device.

* * * * *